United States Patent
Ueda

(10) Patent No.: US 8,345,112 B2
(45) Date of Patent: Jan. 1, 2013

(54) IMAGE PICKUP APPARATUS, IMAGE CAPTURING SYSTEM, METHOD FOR DRIVING IMAGE PICKUP APPARATUS

(75) Inventor: Toshiharu Ueda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 12/099,954

(22) Filed: Apr. 9, 2008

(65) Prior Publication Data

US 2008/0252743 A1  Oct. 16, 2008

(30) Foreign Application Priority Data

Apr. 12, 2007  (JP) ................................. 2007-105251

(51) Int. Cl.
*H04N 5/228* (2006.01)
(52) U.S. Cl. ................................................... 348/222.1
(58) Field of Classification Search ............... 348/222.1, 348/294, 302, 308, 333.01, 349
See application file for complete search history.

(56) References Cited

U.S. PATENT DOCUMENTS

| | | | | |
|---|---|---|---|---|
| 6,094,223 A | * | 7/2000 | Kobayashi | 348/354 |
| 6,906,751 B1 | * | 6/2005 | Norita et al. | 348/349 |
| 6,972,799 B1 | * | 12/2005 | Hashimoto | 348/350 |
| 7,528,875 B2 | * | 5/2009 | Kuroda | 348/302 |
| 2005/0259169 A1 | * | 11/2005 | Ito et al. | 348/308 |

FOREIGN PATENT DOCUMENTS

| | | |
|---|---|---|
| JP | 2005-277513 A | 10/2005 |
| JP | 2007-150643 A | 6/2007 |

* cited by examiner

*Primary Examiner* — Chieh M Fan
*Assistant Examiner* — Akshay Trehan
(74) *Attorney, Agent, or Firm* — Canon USA, Inc., IP Division

(57) ABSTRACT

An image pickup apparatus has a pixel array including a plurality of photoelectric conversion elements arranged in column and row directions, a first output unit configured to be driven by a first driving signal and to output first signals fed from at least some of the photoelectric conversion elements in the pixel array, and a second output unit configured to be driven by a second driving signal and to output second signals fed from at least some of the photoelectric conversion elements in the pixel array. The first driving signal and the second driving signal are asynchronous.

6 Claims, 17 Drawing Sheets

| FIG. 10A | FIG. 10B |

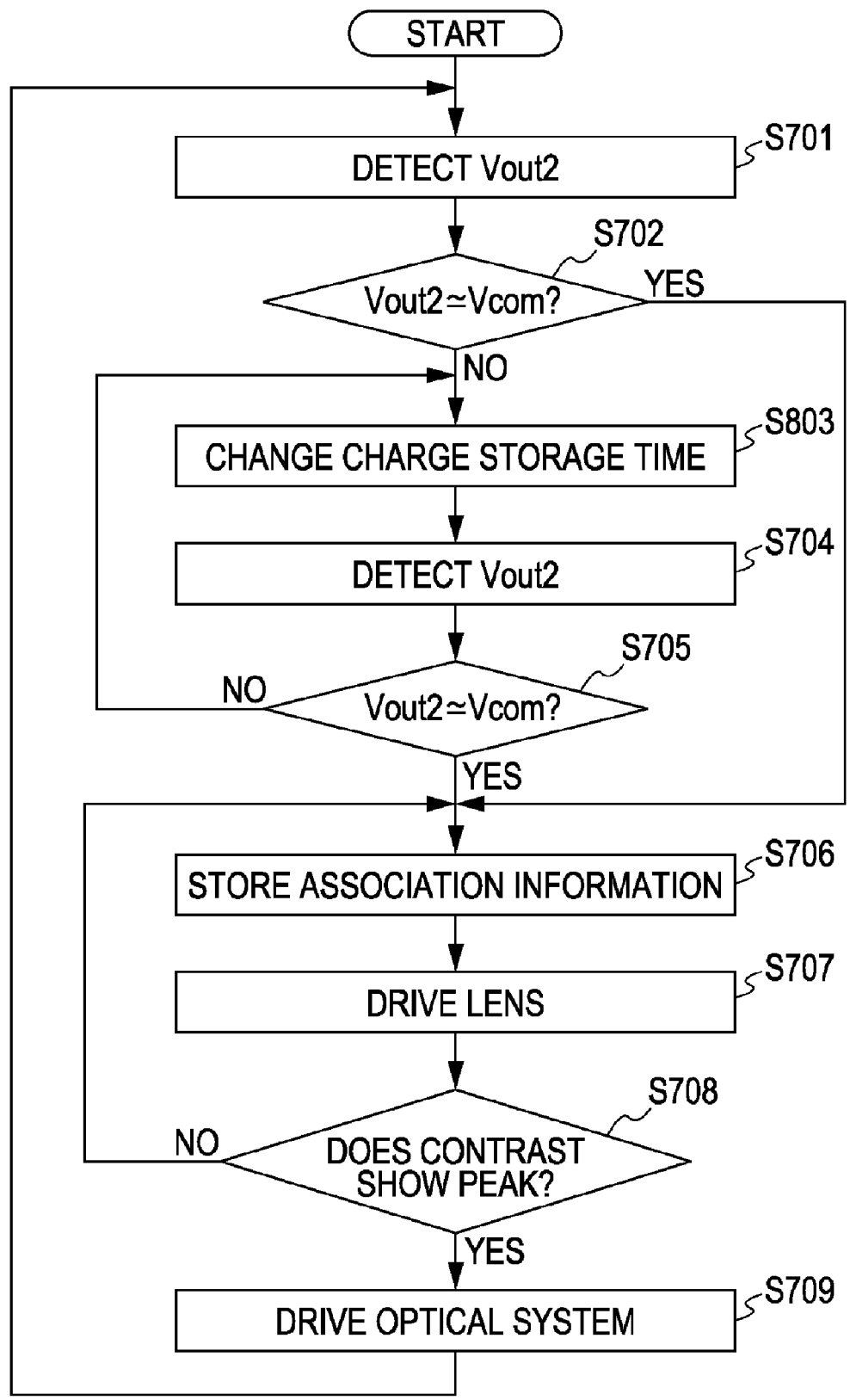

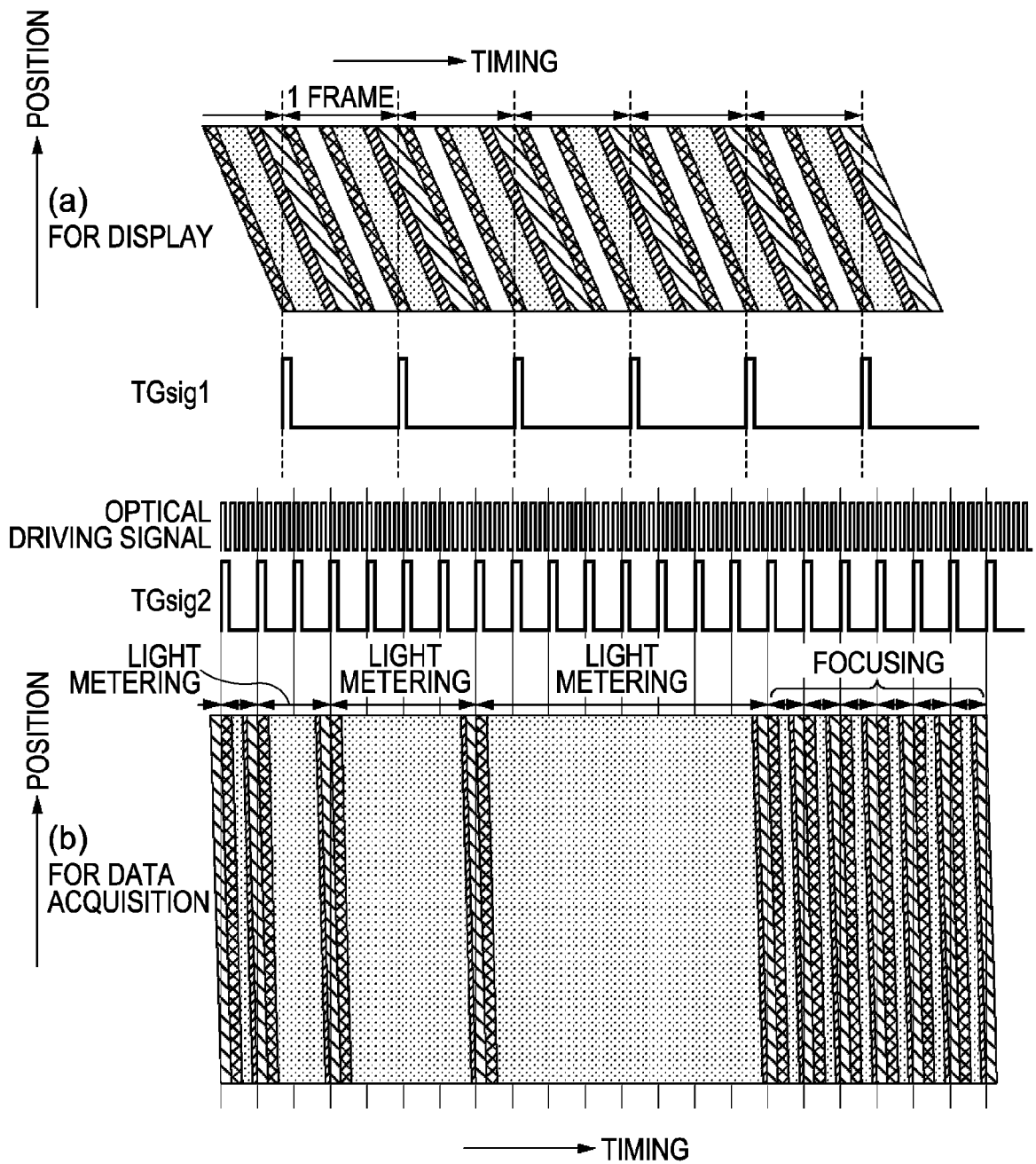

| FIG. 14A | FIG. 14B |

IMAGE PICKUP APPARATUS, IMAGE CAPTURING SYSTEM, METHOD FOR DRIVING IMAGE PICKUP APPARATUS

BACKGROUND OF THE INVENTION

1. Field of the Invention

The present invention relates to image pickup apparatuses, image capturing systems, and methods for driving image pickup apparatuses.

2. Description of the Related Art

Recently, image pickup apparatuses, such as digital cameras and video cameras, having a pixel array, such as a charge coupled device (CCD) image sensor or a complementary metal oxide semiconductor (CMOS) image sensor, including a plurality of photoelectric conversion elements have been widely used. Such image pickup apparatuses generally have an electronic view finder (hereinafter, abbreviated as "EVF") function for repeatedly displaying images captured using an image pickup element (for recording) to allow users to check images of a subject. This EVF function generally uses a liquid crystal display device included in the image pickup apparatuses. An image quality high enough to satisfy the level required for this function can be obtained using data from some of the pixels of the pixel array in displaying of the images. Accordingly, methods for reading out pixel data while thinning out some (rows or columns) of the pixels of the pixel array are often employed.

Execution of focusing and light metering of a subject at this time using signals fed from pixels (thinned-out pixels) whose data is not output as images has been suggested (see Japanese Patent Laid-Open No. 2005-277513). According to this suggestion, an image pickup apparatus includes a first output unit configured to output pixel signals as voltage values and a second output unit configured to output the pixel signals as current values. The image pickup apparatus uses the output values of the first output unit in displaying of images and uses the output values of the second output unit in focusing and light metering operations. In addition, the first and second output units can operate independently and employ different readout cycles (a driving frequency of the second output unit is set lower than that of the first output unit to improve a signal-to-noise (S/N) ratio).

However, since the first and second output units synchronously operate in a technique disclosed in Japanese Patent Laid-Open No. 2005-277513, the operation performance may not be fully improved.

For example, different asynchronous signals are used as a driving signal of an image pickup apparatus and a driving signal (e.g., a motor driving signal) of an image capturing lens in a focusing operation and a face detection operation. When a focusing operation (e.g., a servo AF operation) or a face detecting operation is carried out in synchronization with the driving signal of the image pickup apparatus, a subject may not be tracked sufficiently.

In addition, when an exposure control operation (e.g., an AE operation) is carried out in synchronization with the driving signal of the image pickup apparatus, a target exposure value of photoelectric converting elements may not be finely adjusted according to the luminance of a subject.

SUMMARY OF THE INVENTION

Accordingly, in view of the above-described disadvantage, the present invention provides an image pickup apparatus, an image capturing system, and a method for driving an image pickup apparatus capable of fully improving the operation performance of the image pickup apparatus.

According to a first aspect of the present invention, an image pickup apparatus has a pixel array including a plurality of photoelectric conversion elements arranged in column and row directions, a first output unit configured to be driven by a first driving signal and to output first signals fed from at least some of the photoelectric conversion elements in the pixel array, and a second output unit configured to be driven by a second driving signal and to output second signals fed from at least some of the photoelectric conversion elements in the pixel array. The first driving signal and the second driving signal are asynchronous.

Additionally, according to a second aspect of the present invention, an image pickup apparatus includes a pixel array including a plurality of photoelectric conversion elements arranged in column and row directions, a first output unit configured to be driven by a first driving signal and to output first signals fed from at least some of the photoelectric conversion elements in the pixel array, and a second output unit configured to be driven by a second driving signal and to output second signals fed from at least some of the photoelectric conversion elements in the pixel array. The first driving signal and the second driving signal are synchronous in a first image capturing mode but are asynchronous in a second image capturing mode.

Furthermore, according to a third aspect of the present invention, a method for driving an image pickup apparatus having a pixel array including a plurality of photoelectric conversion elements arranged in column and row directions includes outputting, in response to a first driving signal, first signals fed from at least some of the photoelectric conversion elements in the pixel array, and outputting, in response to a second driving signal, second signals fed from at least some of the photoelectric conversion elements in the pixel array. The first driving signal and the second driving signal are asynchronous.

Further features of the present invention will become apparent from the following description of exemplary embodiments with reference to the attached drawings.

BRIEF DESCRIPTION OF THE DRAWINGS

FIG. 11 is a flowchart showing an example operation of a second output unit.

FIG. 12 is a timing chart showing example operation timings of first and second output units.

DESCRIPTION OF THE EMBODIMENTS

First Exemplary Embodiment

Figure 1:
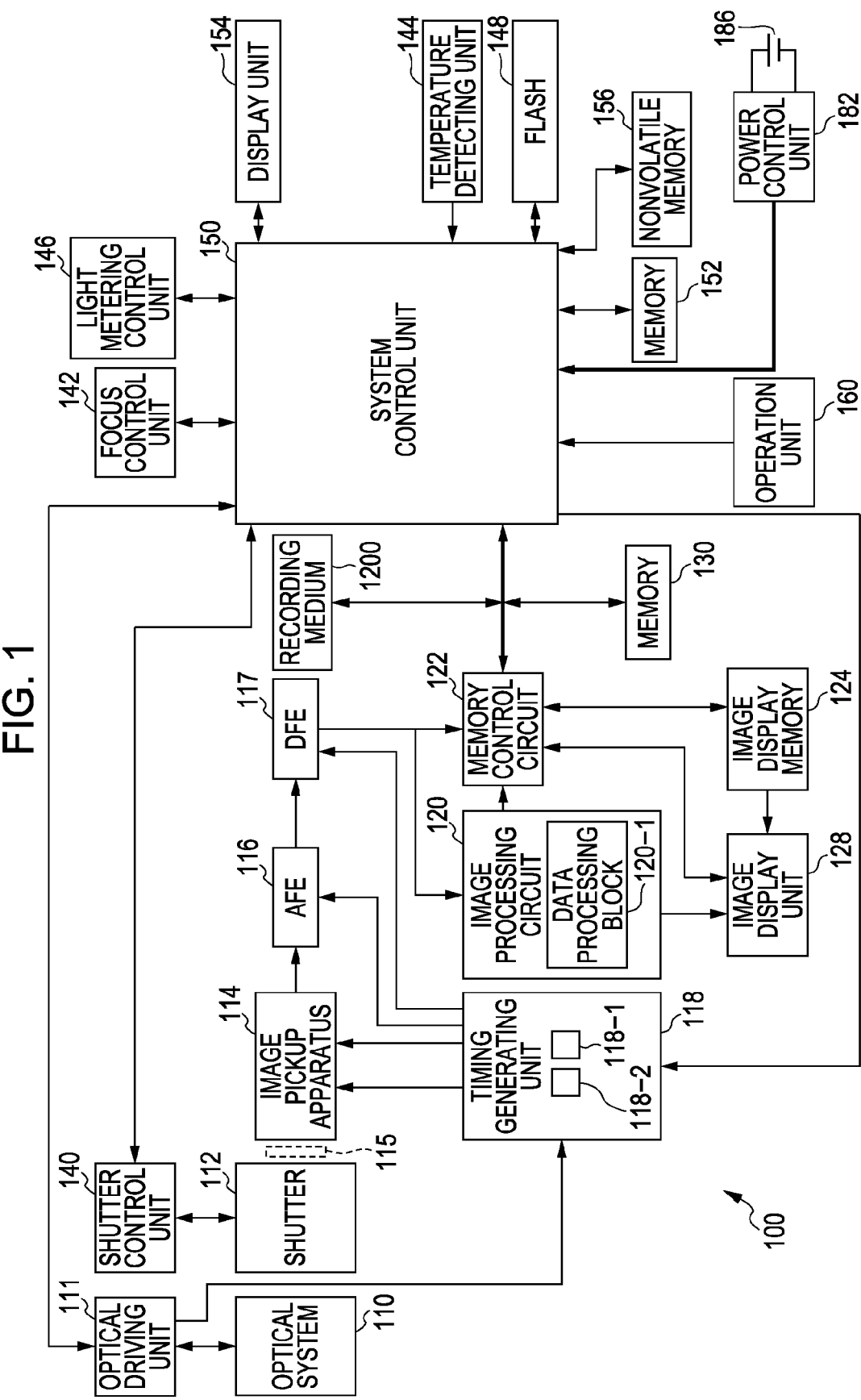
FIG. 1 is a diagram showing an example configuration of an image capturing system according to an exemplary embodiment of the present invention.

An image capturing system 100 according to a first exemplary embodiment of the present invention will be described with reference to FIG. 1. FIG. 1 is a diagram showing an example configuration of the image capturing system 100 according to the first exemplary embodiment of the present invention.

The image capturing system 100 will now be described. An optical system 110 forms an optical image of a subject onto an image pickup apparatus 114, which will be described later. The optical system 110 is, for example, an image capturing lens. The image capturing lens includes a motor (not shown) and a mechanism configured to drive the motor according to a processing result of a focus control unit 142, which will be described later, to adjust the focus.

An optical driving unit 111 transmits information fed from the optical system 110 to a system control unit 150. The optical driving unit 111 also drives the optical system 110 to control operations of the optical system 110 under the control of the system control unit 150. The optical driving unit 111 also includes a control signal generator. The control signal generator generates an optical driving signal for driving the optical driving unit 111 under the control of the system control unit 150. The control signal generator performs a motor driving operation, such as a focusing operation of the optical system 110 or the like, in synchronization with the optical driving signal. The optical driving unit 111 supplies information on the optical driving signal to a timing generating unit 118.

A shutter 112 adjusts the exposure of the image pickup apparatus 114. The image pickup apparatus 114 converts an optical image of a subject into image signals. The image pickup apparatus 114 may be, for example, a charge coupled device (CCD) image sensor or a complementary metal oxide semiconductor (CMOS) image sensor. An internal configuration of this image pickup apparatus 114 will be described later with reference to FIG. 3.

A low-pass filter (hereinafter, abbreviated as "LPF") 115 eliminates unnecessary wavelengths of light (unnecessary wavelengths that affects color reproduction) having passed through the optical system 110. The LPF 115 is arranged between the shutter 112 and the image pickup apparatus 114.

An analog front end circuit (hereinafter, abbreviated as "AFE") 116 includes an analog-to-digital (A/D) converter for converting analog signals output from the image pickup apparatus 114 into digital signals, a clamping circuit (e.g., an offset adjusting circuit), and a digital-to-analog (D/A) converter.

A digital front end circuit (hereinafter, abbreviated as "DFE") 117 receives a digital signal of each pixel through the AFE 116 and performs digital processing, such as correction and rearrangement.

The timing generating unit 118 supplies clock signals and control signals to the image pickup apparatus 114, the AFE 116, and the DFE 117. For example, the timing generating unit 118 generates a first driving signal TGsig1 (TG1) and a second driving signal TGsig2 (TG2). The timing generating unit 118 is controlled by the system control unit 150. The timing generating unit 118 supplies the first driving signal TGsig1 and the second driving signal TGsig2 to a first output unit and a second output unit, which will be described later, respectively.

Here, the first driving signal TGsig1 and the second driving signal TGsig2 are asynchronous. The timing generating unit 118 also receives information on the optical driving signal from the optical driving unit 111. This allows the timing generating unit 118 to generate the second driving signal TGsig2 so that the second driving signal TGsig2 is synchronized with the optical driving signal for driving the optical driving unit 111. The optical driving signal is, for example, a lens driving reference clock.

The timing generating unit 118 includes a first timing generator 118-1 and a second timing generator 118-2. The first timing generator 118-1 generates the first driving signal TGsig1, whereas the second timing generator 118-2 generates the second driving signal TGsig2.

An image processing circuit 120 performs predetermined image processing, such as pixel interpolation and color conversion, on data fed from the DFE 117 or data fed from a memory control circuit 122. The image processing circuit 120 performs predetermined calculation on image data if necessary. The image processing circuit 120 corrects signals output from the image pickup apparatus 114 based on correction data stored in a memory 130, which will be described later. The image processing circuit 120 also performs development processing, such as color conversion of each output signal, to convert the image data into an image. Additionally, the image processing circuit 120 includes a data processing block 120-1. The image processing circuit 120 performs focus detection and luminance detection based on images and supplies the detection results to the system control unit 150 through the memory control circuit 122. This allows the system control unit 150 to send control information to the optical driving unit 111 and to perform a focusing operation of the optical system 110.

The memory control circuit 122 receives image data from the DFE 117 or the image processing circuit 120 and stores the image data in an image display memory 124, the memory 130, or a recording medium 1200.

The image display memory 124 temporarily stores image signals corresponding to an image to be displayed on an image display unit 128, which will be described later.

The image display unit 128 includes a thin-film transistor liquid crystal display (TFT-LCD) or the like. During an electronic view finder (EVF) operation, the image display unit 128 continuously displays images (movies) and allows users to check a movement of a subject.

The memory 130 stores captured still images and movies. The memory 130 has a storage capacity sufficient enough to store a predetermined number of still images or movies for a predetermined time.

A shutter control unit 140 drives the shutter 112 to adjust an aperture thereof.

The focus control unit 142 performs an auto focus (AF) operation. However, in this exemplary embodiment, since focusing and light metering operations are performed using some of signals output from the image pickup apparatus 114, the focus control unit 142 is not used during the EVF operation. A temperature detecting unit 144 measures ambient temperature in an image capturing environment and camera internal temperature (e.g., temperature around the image pickup apparatus 114). The temperature detecting unit 144 is, for example, a thermometer.

A light metering control unit 146 performs an auto exposure (AE) operation. However, in this exemplary embodiment, since focusing and light metering operations are performed using some of signals output from the image pickup apparatus 114, the light metering control unit 146 is not used during the EVF operation. By operating in cooperation with a flash 148, the light metering control unit 146 can have a flash-assisted image capturing function.

The flash 148 (also referred to as a strobe) is used for capturing images in darkness. The flash 148 also have a function for projecting AF auxiliary light.

The system control unit 150 controls the image capturing system 100. The system control unit 150 includes, for example, a central processing unit (CPU).

A memory 152 stores constants, variables, and programs for use in operations of the system control unit 150. The memory 152 stores preset correction data, such as, for example, shading correction data.

A display unit 154 displays operation statuses and messages according to programs executed by the system control unit 150.

A nonvolatile memory 156, such as an electrically erasable programmable read-only memory (EEPROM), stores programs to be described later.

An operation unit 160 receives instructions entered by users. The operation unit 160 includes a shutter switch, an EVF operation switch, a mode setting dial, a single shooting/continuous shooting switch, a continuous-focusing-operation setting switch, an ISO speed setting switch, and a power switch.

Through the shutter switch, two switches (SW1 and SW2) are turned ON step-by-step according to the pressing depth of the shutter switch. At a first step where the shutter switch is half pressed (at a step where the SW1 is turned ON), operations, such as an auto focus (AF) operation, an auto exposure (AE) operation, an auto white balance (AWB) operation, and a flash control (EF) operation, are performed. At a second step where the shutter switch is fully pressed (at a step where the SW2 is turned ON), the shutter control unit 140 controls the shutter 112. This causes an exposure operation for writing signals read out from the image pickup apparatus 114 in the memory 130 as image data through the AFE 116 and the memory control circuit 122 and a development operation using calculation performed in the image processing circuit 120 and the memory control circuit 122 to be performed. In addition, a series of recording operations of reading out image data from the memory 130, compressing the image data, and writing the image data on the recording medium 1200 is performed.

The EVF operation switch is used for continuously displaying images of a subject on the image display unit 128.

The mode setting dial is used for switching between various image capturing modes. The various image capturing modes include, for example, an automatic image capturing mode, a programmed image capturing mode, a shutter speed priority image capturing mode, an aperture priority image capturing mode, a manual image capturing mode, a night view image capturing mode, an astronomical image capturing mode, and a portrait image capturing mode.

The single shooting/continuous shooting switch is used for switching between a single shooting mode and a continuous shooting mode.

The continuous-focusing-operation setting switch is used for repeating an AF operation and a lens focusing operation (generally, the focusing operation is performed only once).

The ISO speed setting switch is used for setting an image capturing sensitivity (the ISO speed). The power switch is used for supplying electric power to each unit of the image capturing system 100. A power control unit 182 includes a battery detecting circuit and a DC-DC converter.

A power supply unit 186 includes a primary battery such as an alkaline battery or a lithium battery, a secondary battery such as a NiCd battery, a NiMH battery, or Li battery, or an AC adaptor. The recording medium 1200 is a removable medium, such as a memory card and a hard disk.

Figures 2, 2A:
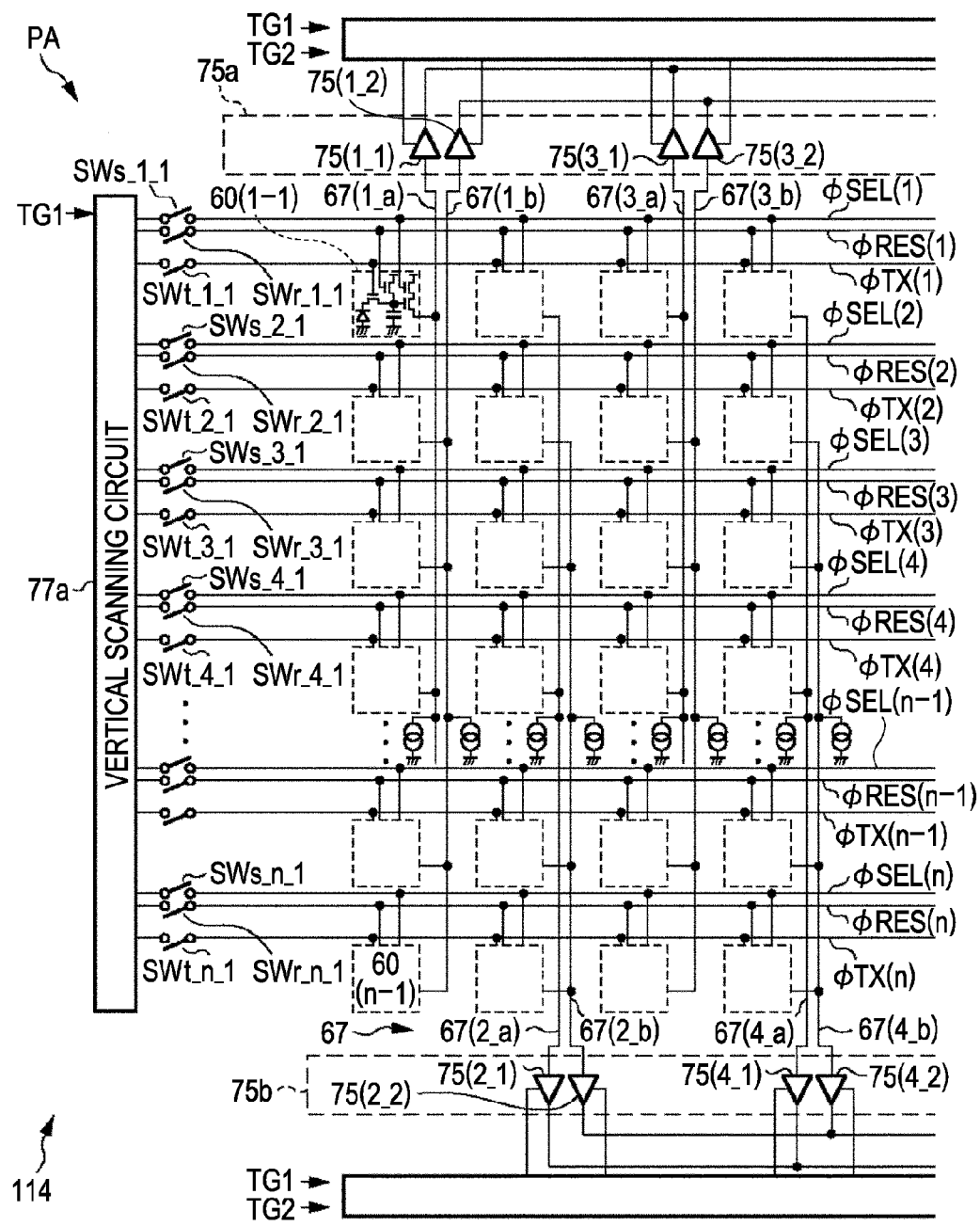
FIGS. 2A and 2B are diagrams showing an example configuration layout of an image pickup apparatus.
Figure 2B:
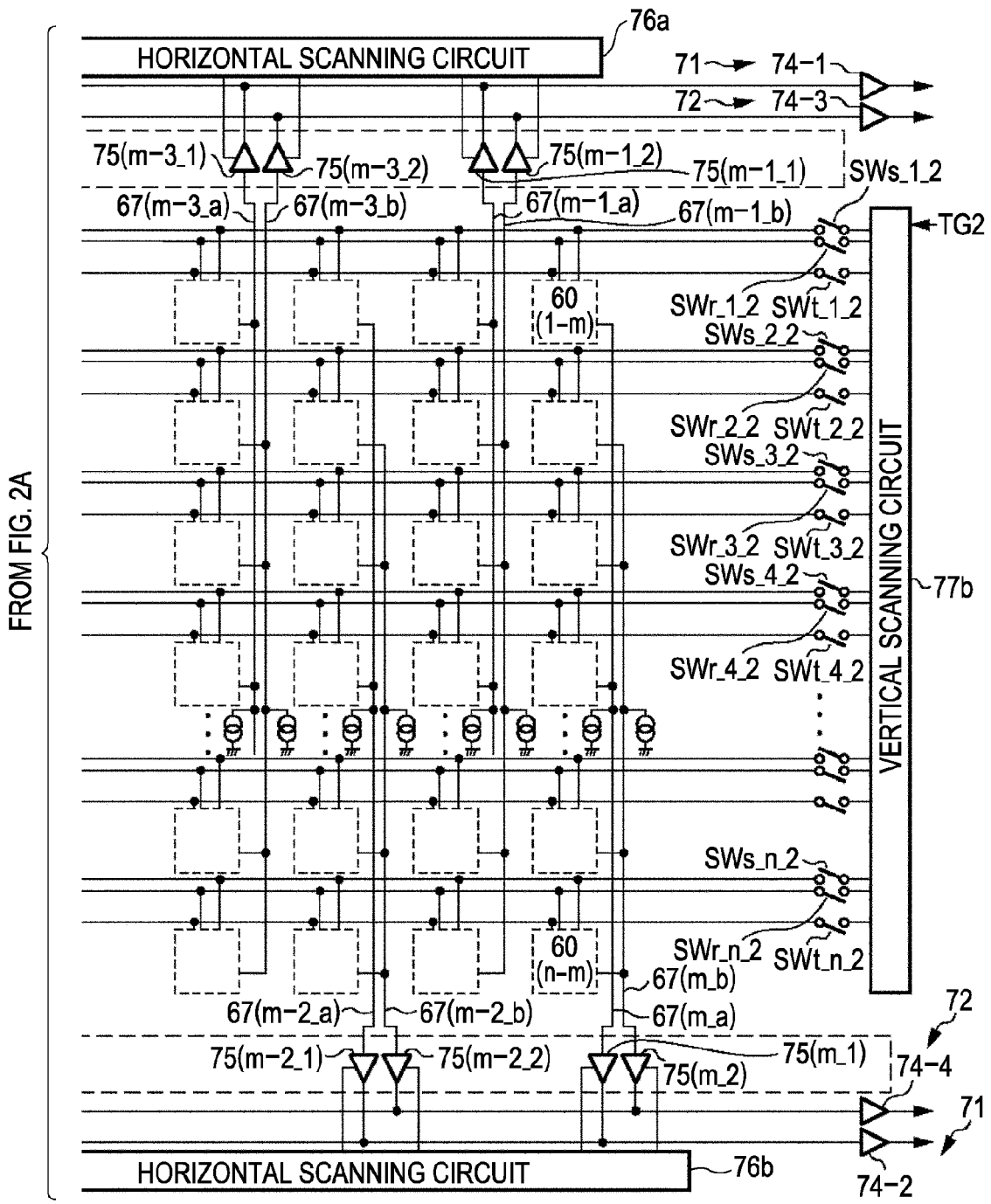

The image pickup apparatus 114 will now be described with reference to FIGS. 2A and 2B. FIGS. 2A and 2B are diagrams showing an example configuration layout of the image pickup apparatus 114.

The image pickup apparatus 114 includes a pixel array PA, vertical scanning circuits 77a and 77b, horizontal scanning circuits 76a and 76b, a first output unit 71, and a second output unit 72.

The pixel array PA includes a plurality of unit pixel (one pixel) 60 (more specifically, pixels 60(1-1) to 60(n-m)) arranged in a matrix. Each unit pixel 60 includes a photoelectric conversion element, which will be described later. That is, the pixel array PA includes a plurality of photoelectric conversion elements arranged in column and row direction. A charge storage operation of each pixel is controlled by signals output from the vertical scanning circuits 77a and 77b.

The vertical scanning circuits 77a and 77b receive the first driving signal TGsig1 and the second driving signal TGsig2 from the timing generating unit 118, respectively. Here, the first driving signal TGsig1 and the second driving signal TGsig2 are asynchronous. In addition, the second driving signal TGsig2 is generated by the timing generating unit 118 to be synchronized with the optical driving signal for driving the optical driving unit 111.

The vertical scanning circuit 77a supplies signals, such as $\phi TX$, $\phi RES$, and $\phi SEL$, to pixels (first pixels) in each row of the pixel array PA based on the first driving signal TGsig1. The vertical scanning circuit 77b supplies signals, such as $\phi TX$, $\phi RES$, and $\phi SEL$, to pixels (second pixels) in each row of the pixel array PA based on the second driving signal TGsig2 through horizontal signal lines corresponding to each signal. Switches SWt_x_1, SWr_x_1, and SWs_x_1 or switches SWt_x_2, SWr_x_2, and SWs_x_2 set signals of the vertical scanning circuit 77a or 77b that are used as control signals on each horizontal line.

More specifically, when the switches SWt_x_1, SWr_x_1, and SWs_x_1 are turned ON, the switches SWt_x_2, SWr_x_2, and SWs_x_2 are turned OFF. This allows the vertical scanning circuit 77a to supply signals, such as $\phi TX$, $\phi RES$, and $\phi SEL$, to the pixels (the first pixels) in each row through the corresponding horizontal signal lines on the basis of the first driving signal TGsig1.

In addition, when the switches SWt_x_2, SWr_x_2, and SWs_x_2 are turned ON, the switches SWt_x_1, SWr_x_1, and SWs_x_1 are turned OFF. This allows the vertical scanning circuit 77b to supply signals, such as $\phi TX$, $\phi RES$, and $\phi SEL$, to the pixels (the second pixels) in each row through the corresponding horizontal signal lines on the basis of the second driving signal TGsig2.

The switches SWt_x_1, SWr_x_1, and SWs_x_1 or the switches SWt_x_2, SWr_x_2, and SWs_x_2 are set ON/OFF through communication with the system control unit 150 (not shown). One of the switches SWt_x_1, SWr_x_1, and SWs_x_1 and the switches SWt_x_2, SWr_x_2, and SWs_x_2 are turned ON at one time.

Both of the horizontal scanning circuits 76a and 76b receive the first driving signal TGsig1 and the second driving signal TGsig2 from the timing generating unit 118. Based on the first driving signal TGsig1, the horizontal scanning circuits 76a and 76b read out signals output from pixels (first pixels) in each column of the pixel array PA to vertical output lines 67(i_a) (where i is a natural number) and supplies the signals to the first output unit 71 to be described later. In addition, based on the second driving signal TGsig2, the horizontal scanning circuits 76a and 76b read out signals output form pixels (second pixels) in each column of the pixel array PA to second vertical output lines 67(i_b) (where i is a natural number) and supplies the signals to the second output unit 72 to be described later.

Here, the vertical output lines 67 includes the first vertical output lines 67(i_a) (where i is a natural number) and the second vertical output lines 67(i_b) (where i is a natural number). Each first vertical output line 67(i_a) is connected to, for example, every three vertically arranged pixels (the first pixels). The second vertical output lines 67(i_b) are connected to pixels (the second pixels) other than those connected to the first vertical output lines 67(i_a), for example.

The first output unit 71 is driven by the first driving signal TGsig1 through the horizontal scanning circuits 76a and 76b and outputs first signals fed from at least some pixels (the first pixels) in the pixel array PA. More specifically, the first output unit 71 includes S-N circuits 75(i_1) (where i is a natural number) and output amplifiers 74-1 and 74-2. Among the S-N circuits 75(i_1), those with odd number "i" and those with even number "i" are collectively referred to as S-N circuits 75a and 75b, respectively. The S-N circuits 75(i_1) are driven by the horizontal scanning circuits 76a and 76b based on the first driving signal TGsig1 and supply the output amplifiers 74-1 and 74-2 with signals fed from corresponding pixels to the first vertical output lines 67(i_a). The output amplifiers 74-1 and 74-2 output the signals supplied from the S-N circuits 75(i_1) to a subsequent stage after amplifying the signals.

The first signals are used in at least one of an image displaying operation and an image recording operation. For example, the first signals are used in the EVF operation.

The second output unit 72 is driven by the second driving signal TGsig2 through the horizontal scanning circuits 76a and 76b and outputs second signals fed from at least some pixels (the second pixels) in the pixel array PA. More specifically, the second output unit 72 includes S-N circuits 75(i_2) (where i is a natural number) and output amplifiers 74-3 and 74-4. The S-N circuits 75(i_2) are driven by the horizontal scanning circuits 76a and 76b based on the second driving signal TGsig2 and supply the output amplifiers 74-3 and 74-4 with signals output from corresponding pixels (the second pixels) to the second vertical output lines 67(i_b). The output amplifiers 74-3 and 74-4 output the signals supplied from the S-N circuits 75(i_2) to a subsequent stage after amplifying the signals.

The second signals are signals for use in acquisition of evaluation data based on which an image capturing condition is decided. For example, the second signals are used in a focusing operation (an AF operation).

Although pixels (the first pixels) whose signals are output by the first output unit 71 and pixels (the second pixels) whose signals are output by the second output unit 72 are different from one another in FIG. 2, these pixels may be the same pixels. When the first and second output units 71 and 72 output signals from the same pixels, the first and second output units 71 and 72 output signals at different times.

Figure 3:
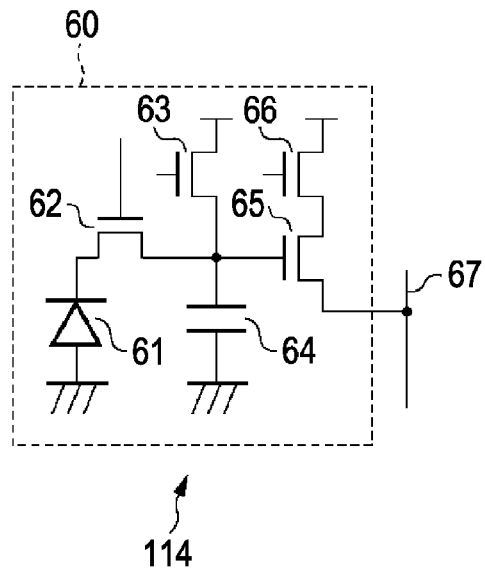
FIG. 3 is a diagram showing an example circuit configuration of a unit pixel in a pixel array.

The unit pixel 60 included in the pixel array PA will now be described with reference to FIG. 3. FIG. 3 is a diagram showing an example circuit configuration of the unit pixel 60 included in the pixel array PA.

A photoelectric conversion element 61 performs photoelectric conversion and a charge storage operation for storing a charge (signal) corresponding to an optical image of a subject. The photoelectric conversion element 61 may be, for example, a photodiode (hereinafter, abbreviated as PD).

A transfer switch (hereinafter, abbreviated as TX) 62 may be, for example, a transistor. Upon the signal ϕTX supplied to a gate thereof becoming active, the TX 62 is turned ON and transfers the charge (signal) stored by the photoelectric conversion element 61 to a floating diffusion 64, which will be described later.

The floating diffusion (hereinafter, abbreviated as FD) 64 serves as a capacitor. The FD 64 holds the charge stored in the PD 61 and transferred through the TX 62 and generates voltage (a signal) corresponding to an amount of the charge.

An amplifier 65 operates as, for example, a source follower. The amplifier 65 amplifies the voltage corresponding to the charge held by the FD 64 and outputs the voltage to the vertical output line 67, which will be described later.

A selection switch 66 is, for example, a transistor. Upon the signal ϕSEL supplied to a gate thereof becoming active, the selection switch 66 is tuned ON and allows the voltage (signal) amplified by the amplifier 65 to be output to the vertical output line 67.

The vertical output line 67 supplies a signal (voltage) output from the amplifier 65 to the first output unit 71 or the second output unit 72.

A reset switch 63 resets a potential of the FD 64. The reset switch 63 is, for example, a transistor. Upon the signal ϕRES supplied to the gate thereof becoming active, the reset switch 63 is turned ON and resets the potential of the FD 64.

Figure 4:
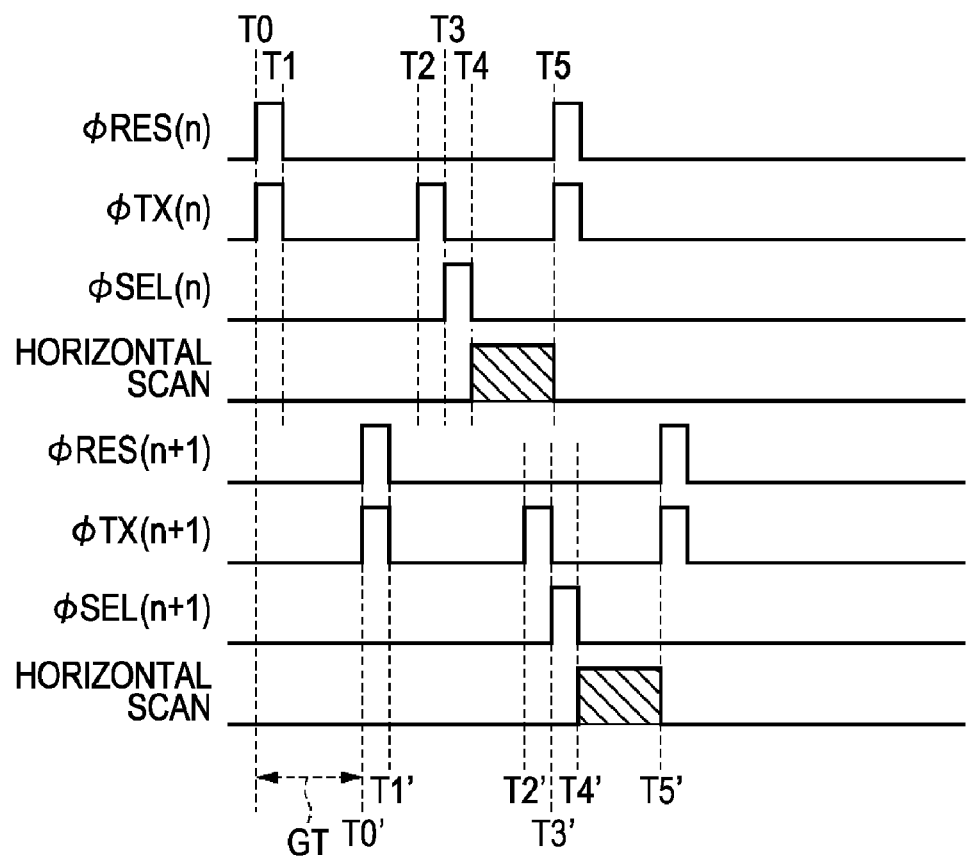
FIG. 4 are waveform charts showing an example operation of an image pickup apparatus.

An operation of the image pickup apparatus 114 will now be described with reference to FIG. 4. FIG. 4 are waveform charts showing an example operation of the image pickup apparatus 114. FIG. 4 shows a signal to be supplied to pixels in a predetermined row (the n-th row) and a signal to be supplied to pixels in a row following the predetermined row (the (n+1)th row).

At a time T0, the vertical scanning circuits 77a and 77b set signals ΦRES(n) and ΦTX(n) active. This triggers the start of resetting of pixels in the n-th row. More specifically, the reset switch 63 of a pixel in the n-th row resets the potential of the FD 64 and resets the potential of the photoelectric conversion element 61 through the transfer switch 62 (dumps the stored charge).

At a time T1, the vertical scanning circuits 77a and 77b set the signals ΦRES(n) and ΦTX(n) inactive. At this time, the photoelectric conversion element 61 starts a charge storage operation.

At a time T2, the vertical scanning circuits 77a and 77b set the signal ΦTX(n) active to transfer the charge stored in the photodiode 61 to the FD 64. More specifically, a period between T1 and T2 corresponds to an exposure time (a charge storage time) of the image pickup apparatus 114.

At a time T3, the vertical scanning circuits 77a and 77b set the signal ΦTX(n) inactive to stop transferring the charge to the FD 64 and also set the signal ΦSEL(n) active to output the voltage of the FD 64 to the vertical signal line 67 after amplifying the voltage by the amplifier 65.

At a time T4, the vertical scanning circuits 77a and 77b set the signal ΦSEL(n) inactive. At the same time, the horizontal scanning circuits 76a and 76b control the S-N circuits 75(i_1) and 75(i_2) based on the first driving signal TGsig1 or the second driving signal TGsig2. This causes the first output unit 71 to output the first signal from a pixel in the n-th row. Alternatively, the second output unit 72 outputs the second signal from a pixel in the n-th row. At a time T5, the vertical scanning circuits 77a and 77b set the signals ΦRES(n) and ΦTX(n) active. This causes the pixels in the n-th row to be reset.

This is an exemplary single-horizontal-row storage-and-readout operation in the n-th row. Similarly, an exemplary single-horizontal-row storage-and-readout operation in the (n+1)th row is performed after a predetermined time GT from the operation in the n-th row as shown by the signals ΦRES (n+1), ΦTX(n+1), and ΦSEL(n+1). More specifically, at a time T0', the vertical scanning circuits 77a and 77b set signals ΦRES(n+1) and ΦTX(n+1) active. This triggers the start of resetting of pixels in the (n+1)th row. More specifically, the reset switch 63 of a pixel in the (n+1)th row resets the potential of the FD 64 and resets the potential of the photoelectric conversion element 61 through the transfer switch 62 (dumps the stored charge). At a time T1', the vertical scanning circuits 77a and 77b set the signals ΦRES(n+1) and ΦTX(n+1) inactive. At this time, the photoelectric conversion element 61 starts a charge storage operation.

At a time T2', the vertical scanning circuits 77a and 77b set the signal ΦTX(n+1) active to transfer the charge stored in the photodiode 61 to the FD 64.

At a time T3', the vertical scanning circuits 77a and 77b set the signal ΦTX(n+1) inactive to stop transferring the charge to the FD 64 and also set the signal ΦSEL(n+1) active to output the voltage of the FD 64 to the vertical signal line 67 after amplifying the voltage by the amplifier 65.

At a time T4', the vertical scanning circuits 77a and 77b set the signal ΦSEL(n+1) inactive. At the same time, the horizontal scanning circuits 76a and 76b control the S-N circuits 75(i_1) and 75(i_2) based on the first driving signal TGsig1 or the second driving signal TGsig2. This causes the first output unit 71 to output the first signal from a pixel in the (n+1)th row. Alternatively, the second output unit 72 outputs the second signal from a pixel in the (n+1)th row. At a time T5', the vertical scanning circuits 77a and 77b set the signals ΦRES (n+1) and ΦTX(n+1) active. This causes the pixels in the (n+1)th row to be reset. In this manner, an electronic rolling storage operation, which is an operation related to movies (continuous image capturing), such as an electronic view finder, is performed.

As shown in FIGS. 2A and 2B, pixels (the first pixels) whose signals are output by the first output unit 71 differ from pixels whose signals are output by the second output unit 72. Accordingly, the first and second output units 71 and 72 may output signals simultaneously and in parallel. On the other hand, when the first and second output units 71 and 72 output signals from the same pixels, the first and second output units 71 and 72 output signals at different times.

Figure 5:
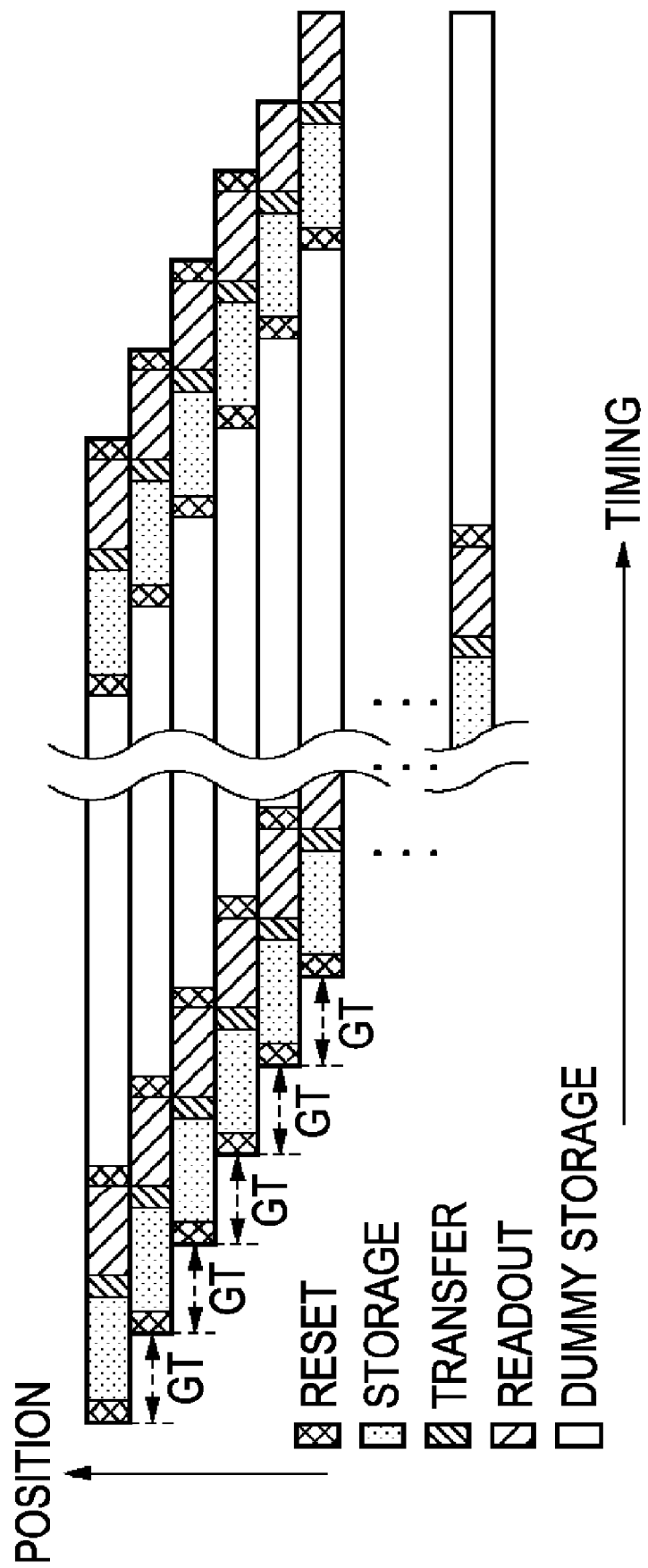
FIG. 5 is a timing chart showing an example electronic rolling storage operation of an image pickup apparatus.

An electronic rolling storage operation of the image pickup apparatus 114 will now be described with reference to FIG. 5. FIG. 5 is a timing chart showing an example electronic rolling storage operation of the image pickup apparatus 114. In FIG. 5, a vertical axis represents a position of each row, whereas a horizontal axis represents timing.

In each row, a first reset operation, a charge storage operation, a transfer operation, a readout operation, and a second reset operation are sequentially performed before a dummy charge storage operation (a dummy storage). The period of the charge storage operation corresponds to the above-described charge storage time. Timings of the first reset operation, the charge storage operation, the transfer operation, the readout operation, and the second reset operation in a predetermined row and a row following the predetermined row are shifted by a predetermined time GT. More specifically, the first reset operation corresponds to a mechanical front curtain of a rolling shutter, whereas the readout operation corresponds to a mechanical rear curtain. Additionally, the charge storage operation corresponds to a rolling storage operation.

Figure 6:
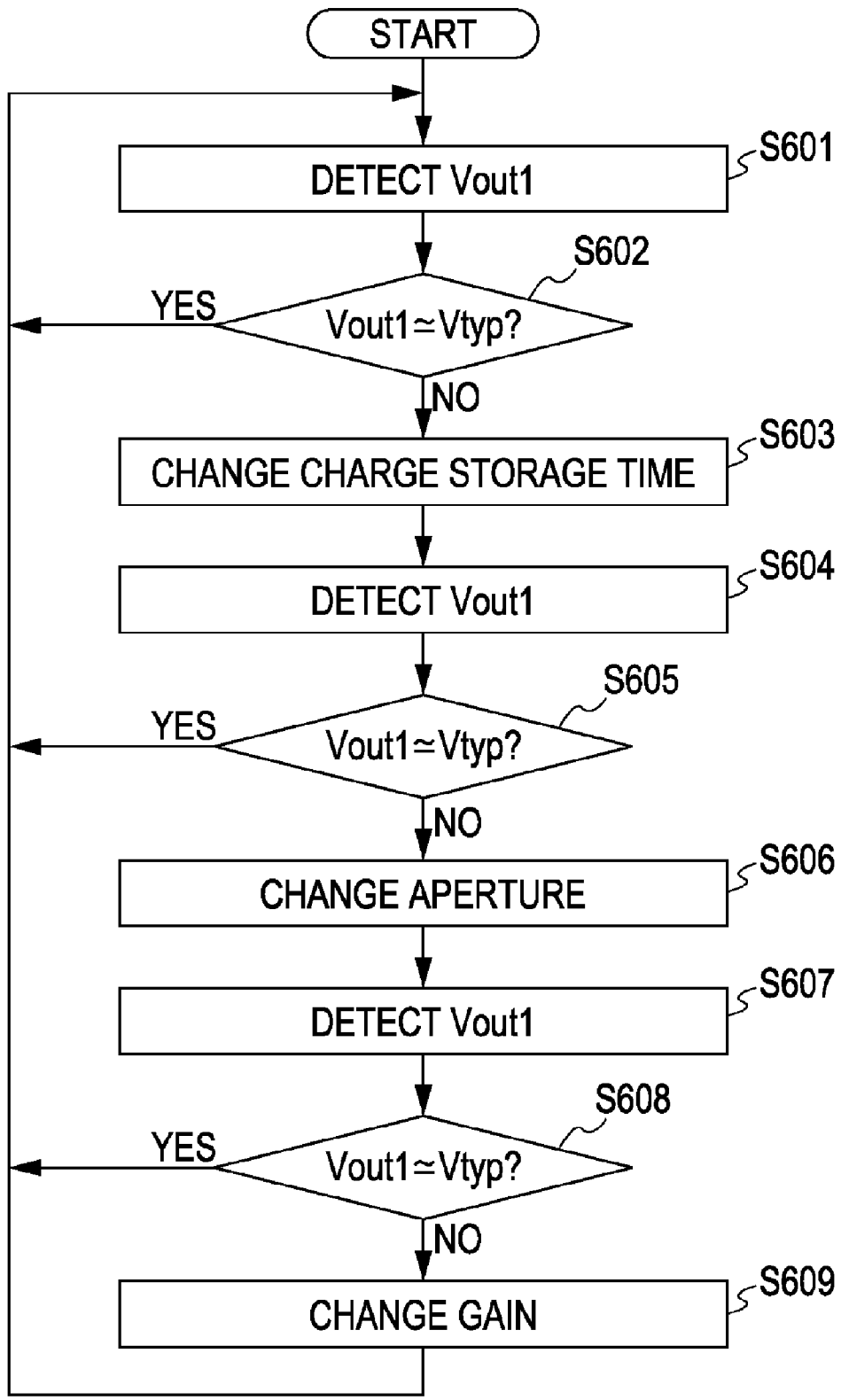
FIG. 6 is a flowchart showing an example operation of a first output unit.

An operation of the first output unit 71 will now be described with reference to FIG. 6. FIG. 6 is a flowchart showing an example operation of the first output unit 71.

At STEP S601, the timing generating unit 118 generates the first driving signal TGsig1 and supplies the first driving signal TGsig1 to the horizontal scanning circuits 76a and 76b of the image pickup apparatus 114. The first output unit 71 of the image pickup apparatus 114 is driven by the first driving signal TGsig1 through the horizontal scanning circuits 76a and 76b and outputs, to the AFE 116, the first signals from at least some of the pixels in the pixel array PA. The first signal is used in at least one of an image displaying operation and an image recording operation. The AFE 116 performs analog signal processing, such as A/D conversion, to generate first image data and outputs the first image data to DFE 117. The DFE 117 supplies the first image data to the image processing circuit 120. The data processing block 120-1 of the image processing circuit 120 detects, based on the first image data, an average output level Vout1 of the first image data.

At STEP S602, the image processing circuit 120 compares the average output level Vout1 detected by the data processing block 120-1 with a preferable exposure output level Vtyp to determine whether the average output level Vout1 is substantially equal to the preferable exposure output level Vtyp. If the image processing circuit 120 determines that the average output level Vout1 is substantially equal to the preferable exposure output level Vtyp, the process returns to STEP S601. If the image processing circuit 120 determines that the average output level Vout1 is not substantially equal to the preferable exposure output level Vtyp, the process proceeds to STEP S603.

At STEP S603, the image processing circuit 120 supplies the system control unit 150 with information indicating that the average output level Vout1 is not substantially equal to the preferable exposure output level Vtyp through the memory control unit 122. The system control unit 150 controls the timing generating unit 118 to change a target charge storage time of pixels whose signals are output by the first output unit 71 so that the average output level Vout1 approaches the output level Vtyp.

The timing generating unit 118 generates a charge storage control signal based on the target charge storage time and supplies the control signal to the vertical scanning circuits 77a and 77b of the image pickup apparatus 114. The vertical scanning circuits 77a and 77b of the image pickup apparatus 114 modify signals, such as φSEL, φRES, and φTX, based on the charge storage control signal and supplies these signals to pixels in each row. Through this operation, the charge storage time of the photoelectric conversion elements 61 is changed in pixels in each row.

At STEP S604, the timing generating unit 118 generates the first driving signal TGsig1 and supplies the first driving signal TGsig1 to the horizontal scanning circuits 76a and 76b of the image pickup apparatus 114. The first output unit 71 of the image pickup apparatus 114 is driven by the first driving signal TGsig1 through the horizontal scanning circuits 76a and 76b and outputs, to the AFE 116, the first signals fed from at least some of the pixels in the pixel array PA. The AFE 116 performs analog signal processing, such as A/D conversion, on the first signals to generate first image data and outputs the first image data to DFE 117. The DFE 117 supplies the first image data to the image processing circuit 120. The data processing block 120-1 of the image processing circuit 120 detects, based on the first image data, an average output level Vout1 of the first image data again.

At STEP S605, the image processing circuit 120 compares the average output level Vout1 detected by the data processing block 120-1 with the preferable exposure output level Vtyp to determine whether the average output level Vout1 is substantially equal to the preferable exposure output level Vtyp. If the image processing circuit 120 determines that the average output level Vout1 is substantially equal to the preferable exposure output level Vtyp, the process returns to STEP S601. If the image processing circuit 120 determines that the average output level Vout1 is not substantially equal to the preferable exposure output level Vtyp, the process proceeds to STEP S606.

At STEP S606, the image processing circuit 120 supplies the system control unit 150 with information indicating that the average output level Vout1 is not substantially equal to the preferable exposure output level Vtyp through the memory control circuit 122. The system control unit 150 controls the shutter control unit 140 to change an opening (aperture) of the shutter 112 so that the average output level Vout1 approaches the output level Vtyp.

At STEP S607, the timing generating unit 118 generates the first driving signal TGsig1 and supplies the first driving signal TGsig1 to the horizontal scanning circuits 76a and 76b of the image pickup apparatus 114. The first output unit 71 of the image pickup apparatus 114 is driven by the first driving signal TGsig1 through the horizontal scanning circuits 76a and 76b and outputs, to the AFE 116, the first signals fed from at least some of the pixels in the pixel array PA. The AFE 116 performs analog signal processing, such as A/D conversion, on the first signals to generate first image data and outputs the first image data to DFE 117. The DFE 117 supplies the first image data to the image processing circuit 120. The data processing block 120-1 of the image processing circuit 120 detects, based on the first image data, an average output level Vout1 of the first image data.

At STEP S608, the image processing circuit 120 compares the average output level Vout1 detected by the data processing block 120-1 with a preferable exposure output level Vtyp to determine whether the average output level Vout1 is substantially equal to the preferable exposure output level Vtyp. If the image processing circuit 120 determines that the average output level Vout1 is substantially equal to the preferable exposure output level Vtyp, the process returns to STEP S601. If the image processing circuit 120 determines that the average output level Vout1 is not substantially equal to the preferable exposure output level Vtyp, the process proceeds to STEP S609.

At STEP S609, the image processing circuit 120 supplies the system control unit 150 with information indicating that the average output level Vout1 is not substantially equal to the preferable exposure output level Vtyp through the memory control circuit 122. The system control unit 150 controls the timing generating unit 118 to change a target gain value for pixels whose signals are output by the first output unit 71 so that the average output level Vout1 approaches the output level Vtyp.

The timing generating unit 118 generates a gain control signal based on the target gain value and supplies the control signal to the first output unit 71 of the image pickup apparatus 114. The output amplifiers 74-1 and 74-2 of the first output unit 71 change the gain based on the gain control signal. The timing generating unit 118 then returns the process back to STEP S601.

In this manner, the operation of the first output unit 71 is performed asynchronously and in parallel to an operation of the second output unit 72.

Meanwhile, this operation sequence is terminated when an electronic view finder operation is terminated through the EVF operation switch or when the operation is shifted into another operation (e.g., a still image capturing operation in response to pressing of the shutter switch).

Although a sequence for sequentially and separately changing a charge storage time, an aperture, and a gain value to adjust the exposure has been described, the charge storage time, the aperture, and the gain value may be simultaneously changed according to an algorithm.

Figure 7:
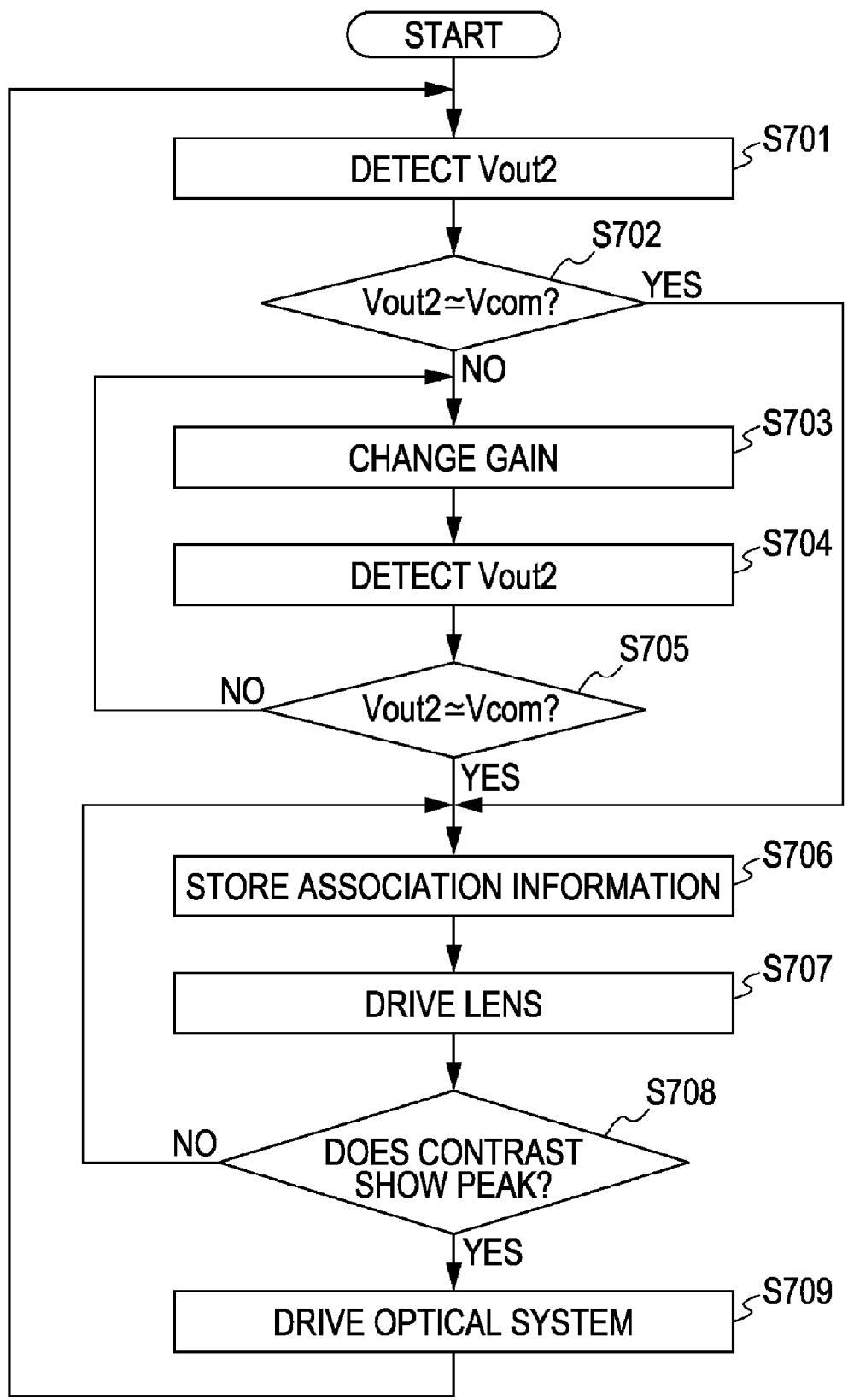
FIG. 7 is a flowchart showing an example operation of a second output unit.

An example operation of the second output unit 72 will now be described with reference to FIG. 7. FIG. 7 is a flowchart showing an example operation of the second output unit 72.

At STEP S701, the timing generating unit 118 generates the second driving signal TGsig2 and supplies the second driving signal TGsig2 to the horizontal scanning circuits 76a and 76b of the image pickup apparatus 114. The second output unit 72 of the image pickup apparatus 114 is driven by the second driving signal TGsig2 through the horizontal scanning circuits 76a and 76b and outputs, to the AFE 116, the second signals fed from some of the pixels in the pixel array PA. The second signals are for focusing and are used in, for example, a focusing operation (an AF operation). The AFE 116 performs analog signal processing, such as A/D conversion, on the second signals to generate second image data and supplies the second image data to the DFE 117. The DFE 117 supplies the second image data to the image processing circuit 120. The data processing block 120-1 of the image processing circuit 120 detects, based on the second image data, an average output level Vout2 of the second image data.

At STEP S702, the image processing circuit 120 compares the average output level Vout2 detected by the data processing block 120-1 with a predetermined output level Vcom to determine whether the average output level Vout2 is substantially equal to the predetermined output level Vcom. If the image processing circuit 120 determines that the average output level Vout2 is substantially equal to the predetermined output level Vcom, the process proceeds to STEP S706. On the other hand, if the image processing circuit 120 determines that the average output level Vout2 is not substantially equal to the predetermined output level Vcom, the process proceeds to STEP S703.

At STEP S703, the image processing circuit 120 supplies the system control unit 150 with information indicating that the average output level Vout2 is not substantially equal to the predetermined output level Vcom through the memory control circuit 122. The system control unit 150 controls the timing generating unit 118 to change a target gain value for pixels whose signals are output by the second output unit 72 so that the average output level Vout2 approaches the output level Vcom.

The timing generating unit 118 generates a gain control signal based on the target gain value and supplies the control signal to the second output unit 72 of the image pickup apparatus 114. The output amplifiers 74-3 and 74-4 of the second output unit 72 change the gain based on the gain control signal.

At STEP S704, the timing generating unit 118 generates the second driving signal TGsig2 and supplies the second driving signal TGsig2 to the horizontal scanning circuits 76a and 76b of the image pickup apparatus 114. The second output unit 72 of the image pickup apparatus 114 is driven by the second driving signal TGsig2 through the horizontal scanning circuits 76a and 76b and outputs, to the AFE 116, the second signals fed from some of the pixels in the pixel array PA. The second signals are for focusing and are used in, for example, a focusing operation (an AF operation). The AFE 116 performs analog signal processing, such as A/D conversion, on the second signals to generate second image data and supplies the second image data to the DFE 117. The DFE 117 supplies the second image data to the image processing circuit 120. The data processing block 120-1 of the image processing circuit 120 detects, based on the second image data, the average output level Vout2 of the second image data again.

At STEP S705, the image processing circuit 120 compares the average output level Vout2 detected by the data processing block 120-1 with the predetermined output level Vcom to determine whether the average output level Vout2 is substantially equal to the predetermined output level Vcom. If the image processing circuit 120 determines that the average output level Vout2 is substantially equal to the predetermined output level Vcom, the process proceeds to STEP S706. On the other hand, if the image processing circuit 120 determines that the average output level Vout2 is not substantially equal to the predetermined output level Vcom, the process returns to STEP S703.

At STEP S706, the image processing circuit 120 detects an average intensity of high-frequency components in the second image data to determine a contrast value P and supplies the contrast value P to the system control unit 150 through the memory control circuit 122. The system control unit 150 accesses the optical driving unit 111 to acquire information on a position of the optical system 110. The system control unit 150 stores, in the memory 130, association information for associating the contrast value P and the position of the optical system 110.

At STEP S707, the system control unit 150 controls the optical driving unit 111 to drive the optical system 110 by a predetermined amount.

At STEP S708, the system control unit 150 determines whether a position of the optical system 110 that gives a peak of the contrast value P exists with reference to the association information. If the system control unit 150 determines that the position of the optical system 110 giving the peak exists, the process proceeds to STEP S709. If the system control unit 150 determines that the position of the optical system 110 giving the peak does not exist, the process returns to STEP S706.

At STEP S709, the system control unit 150 selects peak contrast Pmax and a position Lmax of the optical system 110 corresponding to the peak contrast Pmax. The system control unit 150 then controls the optical driving unit 111 based on the position Lmax of the optical system 110 corresponding to the contrast Pmax to drive the optical system 110. The system control unit 150 then returns the process back to STEP S701.

In this manner, the operation of the second output unit 72 is performed asynchronously and in parallel to the operation of the first output unit 71.

Figure 8:
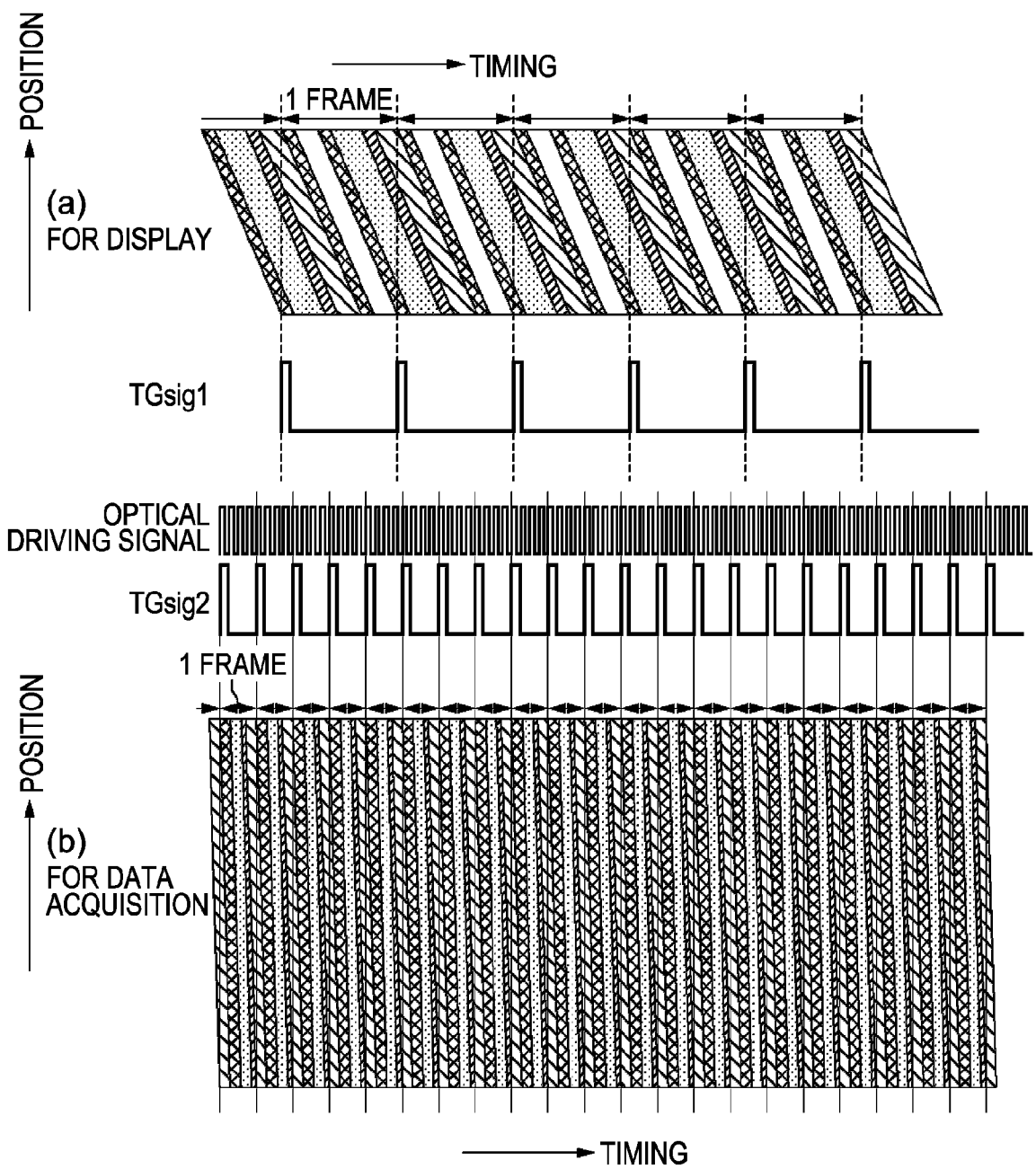
FIG. 8 is a timing chart showing example operation timings of first and second output units.

Operation timings of the first and second output units 71 and 72 will now be described with reference to FIG. 8. FIG. 8 is a timing chart showing example operation timings of the first and second output units 71 and 72.

As shown by a chart (a) of FIG. 8, the first output unit 71 is driven by the first driving signal TGsig1 through the horizontal scanning circuits 76a and 76b and outputs, for each row, the first signals fed from predetermined pixels (first pixels) to a subsequent stage in response to completion of a readout operation from the pixels.

As shown by a chart (b) of FIG. 8, the second output unit 72 is driven by the second driving signal TGsig2 through the horizontal scanning circuits 76a and 76b and outputs, for each row, the second signals fed from predetermined pixels (second pixels) to a subsequent stage in response to completion of a readout operation from the pixels.

In a focusing operation, different asynchronous signals are used as the optical driving signal and the first driving signal TGsig1 for reading out the first signals. In this case, the first driving signal TGsig1 and the second driving signal TGsig2 are asynchronous. More specifically, the second driving signal TGsig2 is not synchronized with the first driving signal TGsig1 but is synchronized with the optical driving signal. With this configuration, a subject can be sufficiently tracked in a focusing operation (e.g. a servo AF operation).

In addition, a cycle of the second driving signal TGsig2 is shorter than that of the first driving signal TGsig1. With this configuration, a subject can be sufficiently tracked even if a driving signal for a focusing operation (e.g. a servo AF operation) is faster than the first driving signal TGsig1. As a result, the operation performance can be fully improved.

Second Exemplary Embodiment

Figure 9:
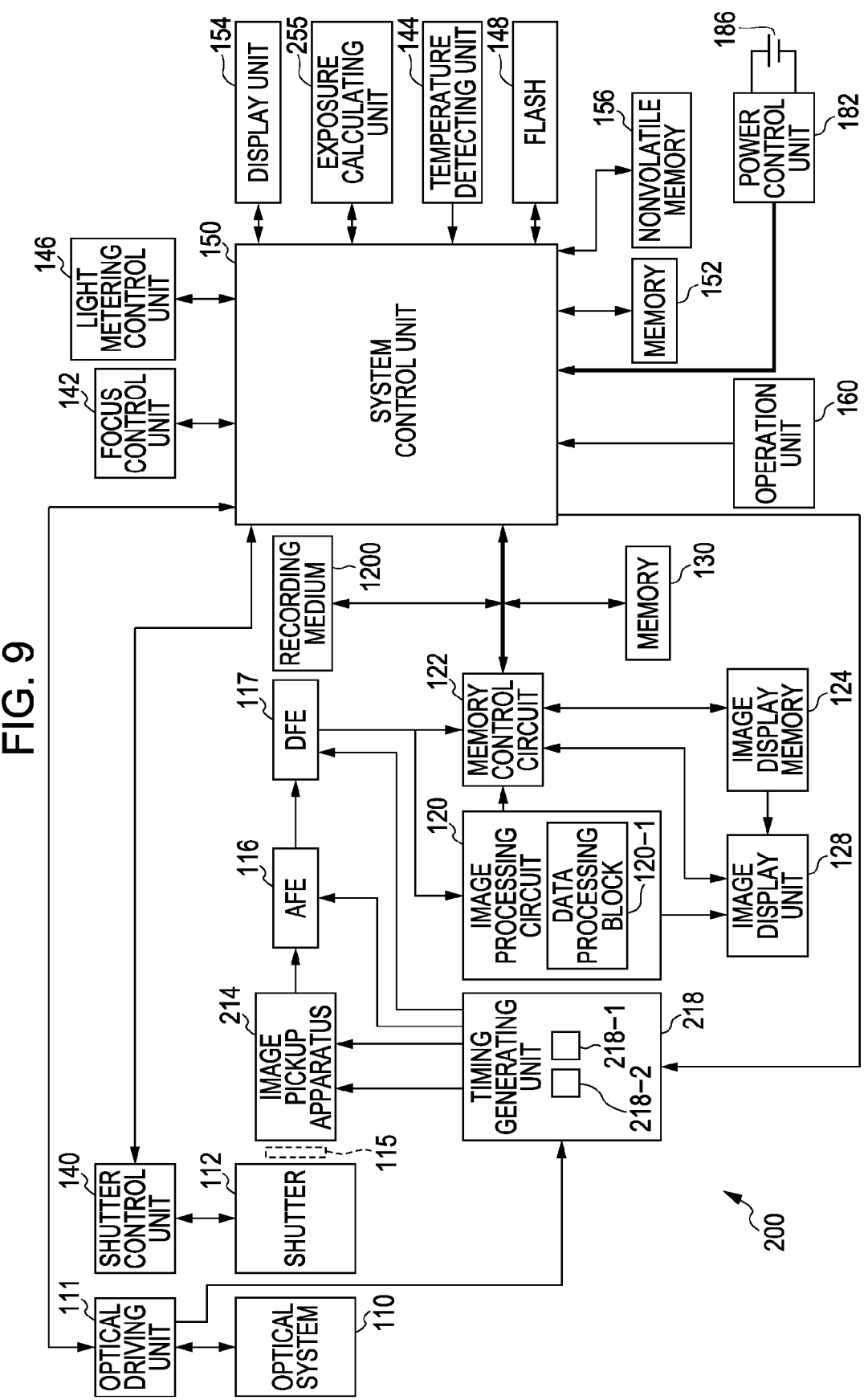
FIG. 9 is a diagram showing an example configuration of an image capturing system according to another exemplary embodiment of the present invention.
Figures 10, 10A:
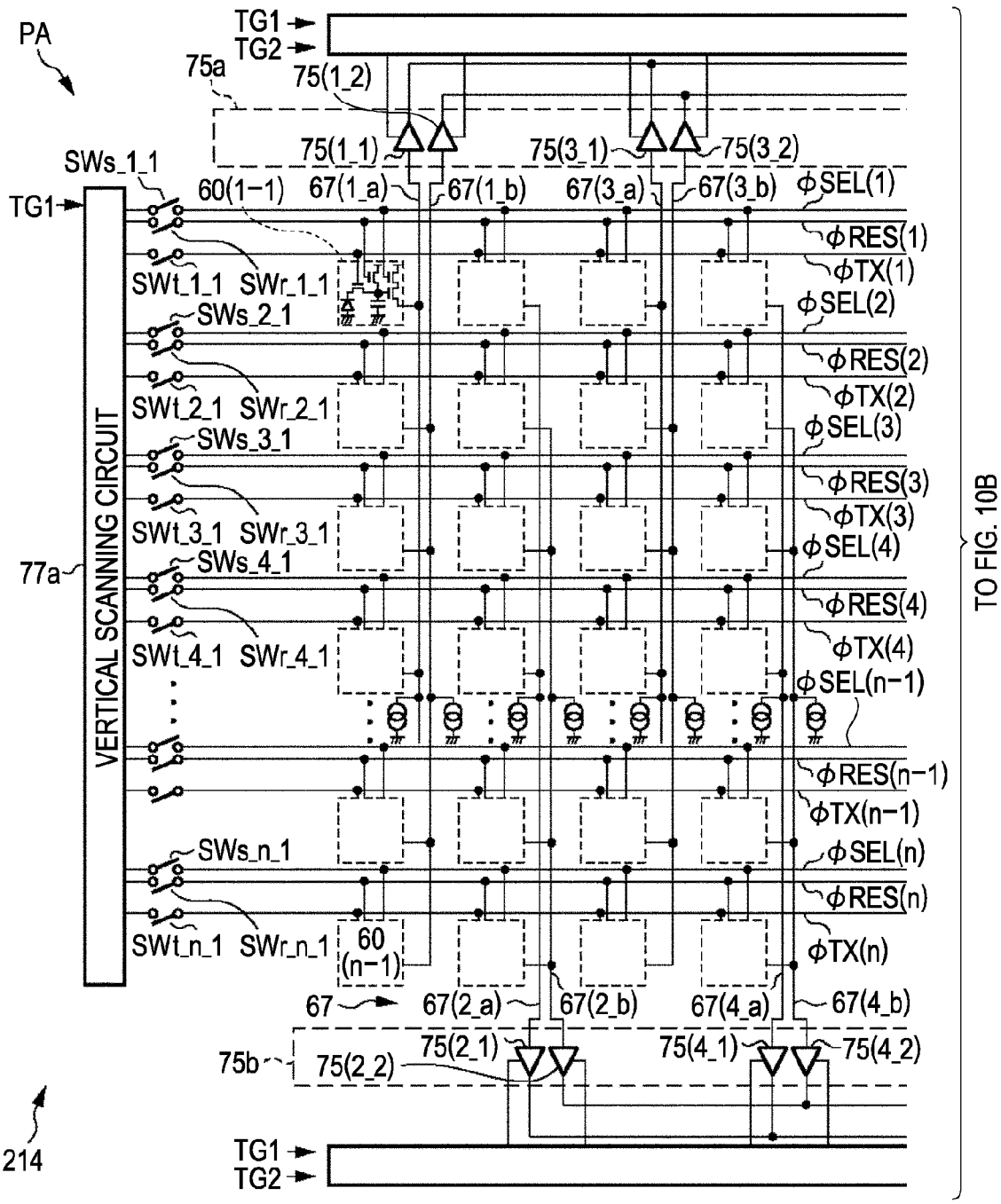
FIGS. 10A and 10B are diagrams showing an example configuration layout of an image pickup apparatus.

An example image capturing system 200 according to a second exemplary embodiment of the present invention will now be described with reference to FIGS. 9, 10A, and 10B. FIG. 9 is a diagram showing an example configuration of the image capturing system 200 according to the second exemplary embodiment of the present invention, whereas FIGS. 10A and 10B are diagrams showing an example configuration layout of an image pickup apparatus 214.

Although a basic configuration of the image capturing system 200 is similar to that of the first exemplary embodiment, the image capturing system 200 differs from the image capturing system according to the first exemplary embodiment in having the image pickup apparatus 214, an exposure calculating unit 255, and a timing generating unit 218.

Figure 10B:
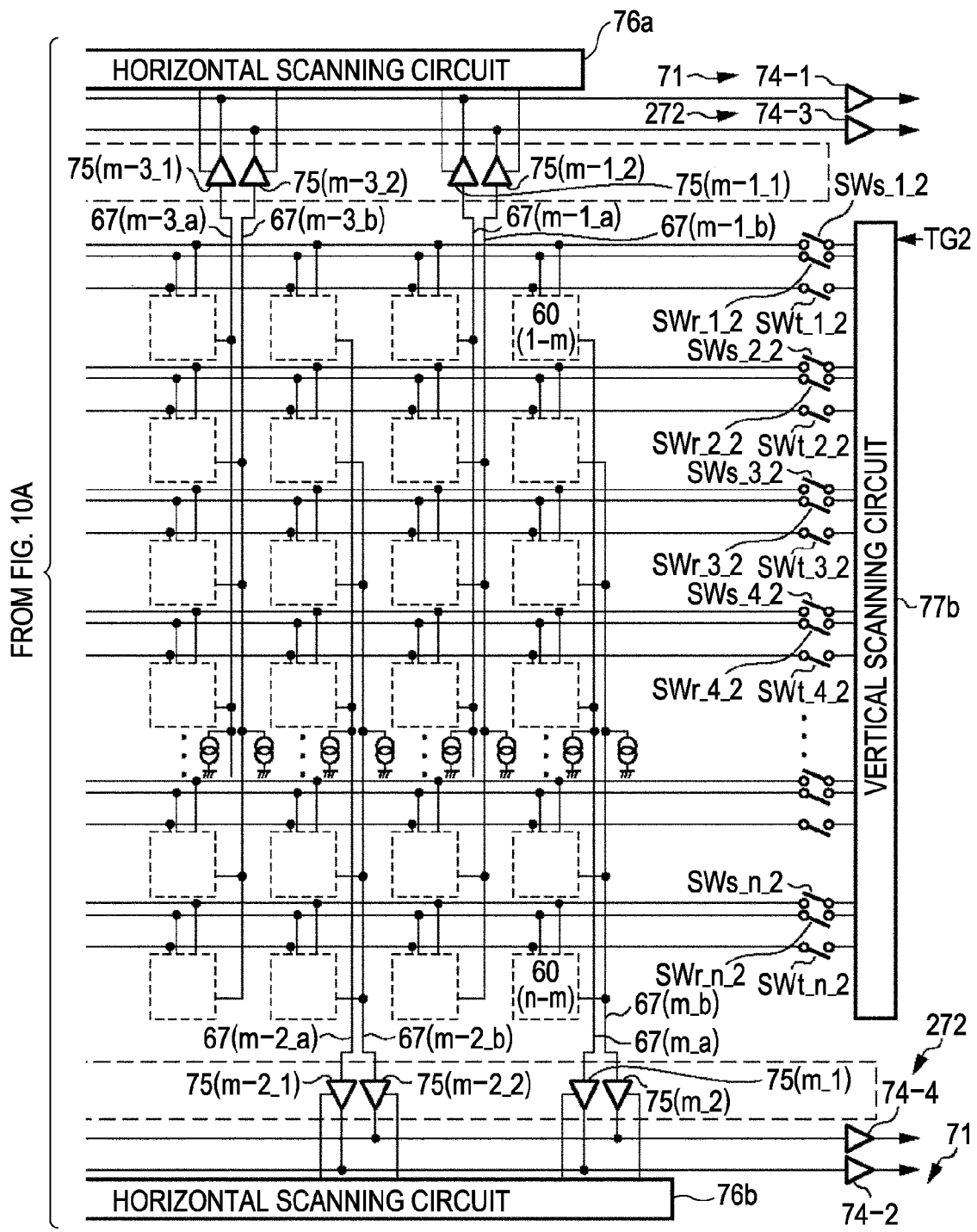

As shown in FIGS. 11A and 10B, the image pickup apparatus 214 differs from the image pickup apparatus according to the first exemplary embodiment in having a second output unit 272. The second output unit 272 is driven by a second driving signal TGsig2 through horizontal scanning circuits 76a and 76b and outputs second signals fed from at least some pixels (second pixels) in a pixel array PA. The second signals are for focusing and light metering and are used in, for example, a focusing operation (an AF operation) and an exposure control operation (an AE operation).

If the second signals according to the first embodiment are used in light metering, an S/N ratio of an image is unpreferable and the image may lack the accuracy since a charge storage time for the second signals is short and the gain level is increased.

On the other hand, in the second exemplary embodiment, the exposure calculating unit 255 calculates a target exposure value of the pixel array PA based on the second signals. The exposure calculating unit 255 supplies information on the target exposure value to the timing generating unit 218 through a system control unit 150. The timing generating unit 218 generates an exposure control signal based on the target exposure value and supplies the control signal to vertical scanning circuits 77a and 77b of the image pickup apparatus 214. The vertical scanning circuits 77a and 77b of the image pickup apparatus 214 modify signals, such as φSEL, φRES, and φTX, based on the exposure control signal and supplies these signals to pixels in each row. Through this operation, the charge storage time of the photoelectric conversion elements 61 is changed in pixels in each row. More specifically, the timing generating unit 218 generates the second driving signal TGsig2 so as to change the charge storage time of the photoelectric conversion elements 61, which output the second signals, according to the target exposure value calculated by the exposure calculating unit 255.

As shown in FIG. 11, an operation of the second output unit 272 differs from that of the first exemplary embodiment in the following points. FIG. 11 is a flowchart showing an example operation of the second output unit 272.

At STEP S803, an image processing circuit 120 supplies the system control unit 150 with information indicating that an average output level Vout2 is not substantially equal to a predetermined output level Vcom through a memory control circuit 122. The image processing circuit 120 also detects the luminance of second image data, which is data based on the second signals. The exposure calculating unit 255 receives information on the luminance of the second image data from the image processing circuit 120 through the memory control circuit 122 and the system control unit 150. The exposure calculating unit 255 calculates a target exposure value of the pixel array PA based on the second signals (according to the luminance of the second image data). The exposure calculating unit 255 supplies information on the target exposure value to the timing generating unit 218 through the system control unit 150.

The timing generating unit 218 generates an exposure control signal based on the target exposure value and supplies the control signal to the vertical scanning circuits 77a and 77b of the image pickup apparatus 214. The vertical scanning circuits 77a and 77b of the image pickup apparatus 214 modify signals, such as φSEL, φRES, and φTX, based on the exposure control signal and supplies these signals to pixels (second pixels) in each row. Through this operation, the charge storage time of the photoelectric conversion elements 61 is changed in pixels in each row. More specifically, the timing generating unit 218 generates the second driving signal TGsig2 so as to change the charge storage time of the photoelectric conversion elements 61, which output the second signals, in accordance with the target exposure value calculated by the exposure calculating unit 255.

Meanwhile, the operation of the second output unit 272 and an operation of a first output unit 71 are performed asynchronously and in parallel, which is the same and or similar to the first exemplary embodiment.

As shown in FIG. 12, operation timings of the first and second output units 71 and 272 differ from those according to the first exemplary embodiment in the following points. FIG. 12 is a timing chart showing example operation timings of the first and second output units 71 and 272.

As shown by a chart (b) of FIG. 12, the second output unit 272 is driven by the second driving signal TGsig2 through the horizontal scanning circuits 76a and 76b. The second output unit 272 outputs, for each row, the second signals fed from predetermined pixels (second pixels) to a subsequent stage in response to completion of a readout operation from the pixels.

Here, the first driving signal TGsig1 and the second driving signal TGsig2 are asynchronous. With this configuration, data giving a preferable exposure level is determined by gradually extending the charge storage time of the photoelectric conversion elements 61 when an exposure control operation (e.g., an AE operation) is performed (at the time of acquisition of light metering data). Since the gain value is not increased during this period, the light metering can be performed at an S/N ratio better than that of a case where the gain value is increased. In addition, fine adjustment of the storage time becomes easier and a more accurate result is obtained. More specifically, the target exposure value of the photoelectric conversion elements 61 can be controlled finely in accordance with the luminance of a subject. As a result, the operation performance can be fully improved.

Third Exemplary Embodiment

Figure 13:
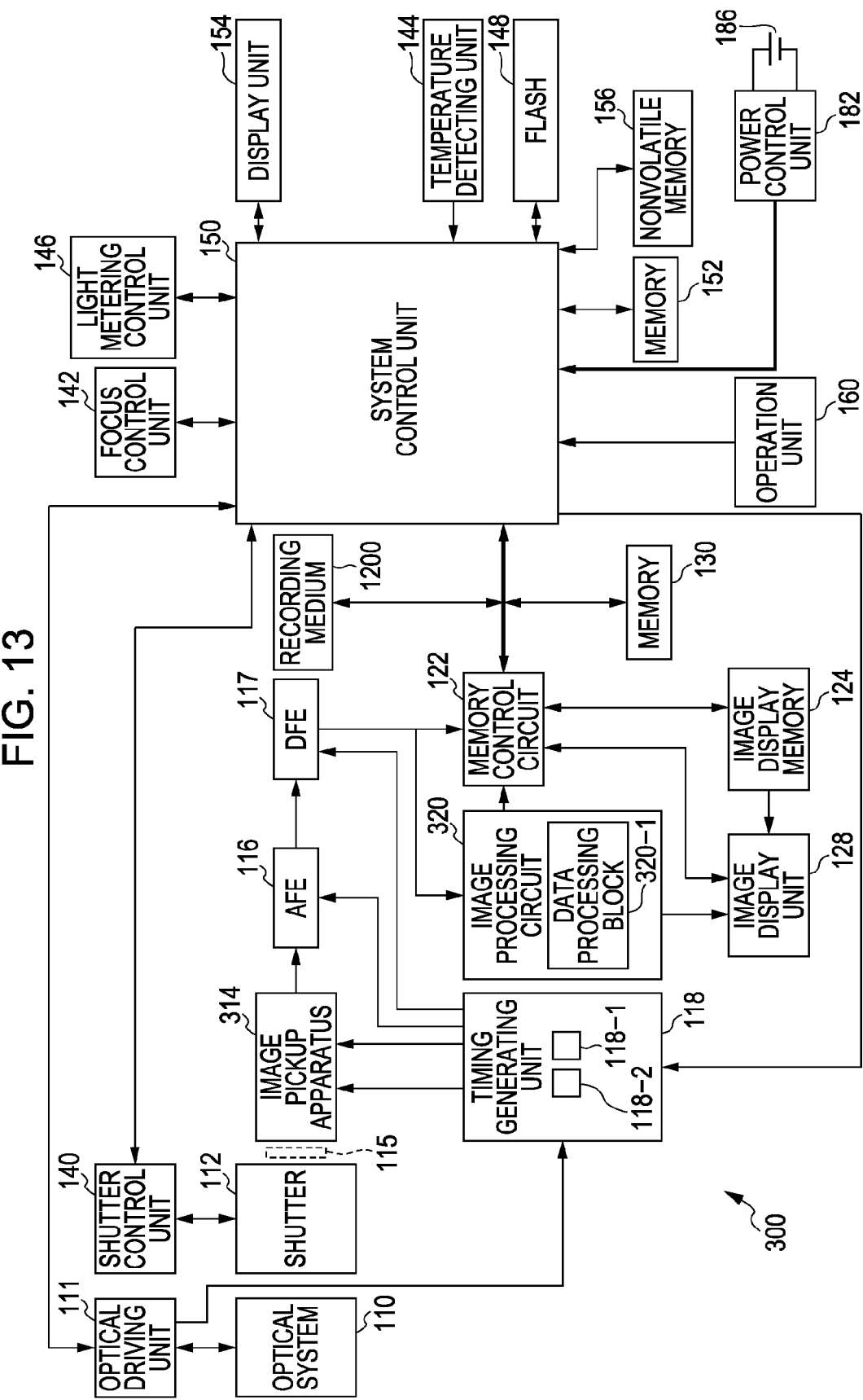
FIG. 13 is a diagram showing an example configuration of an image capturing system according to still another exemplary embodiment of the present invention.

An example image capturing system 300 according to a third exemplary embodiment of the present invention will now be described with reference to FIGS. 13, 14A, and 14B. FIG. 13 is a diagram showing an example configuration of the image capturing system 300 according to the third exemplary embodiment of the present invention, whereas FIGS. 14A and 14B are diagrams showing an example configuration layout of an image pickup apparatus 314.

Although a basic configuration of the image capturing system 300 is similar to those of the first and second exemplary embodiments, the image capturing system 300 differs from the image capturing systems according to the first and second exemplary embodiments in including the image pickup apparatus 314 and an image processing circuit 320 which includes a data processing block 320-1.

Figures 14, 14A:
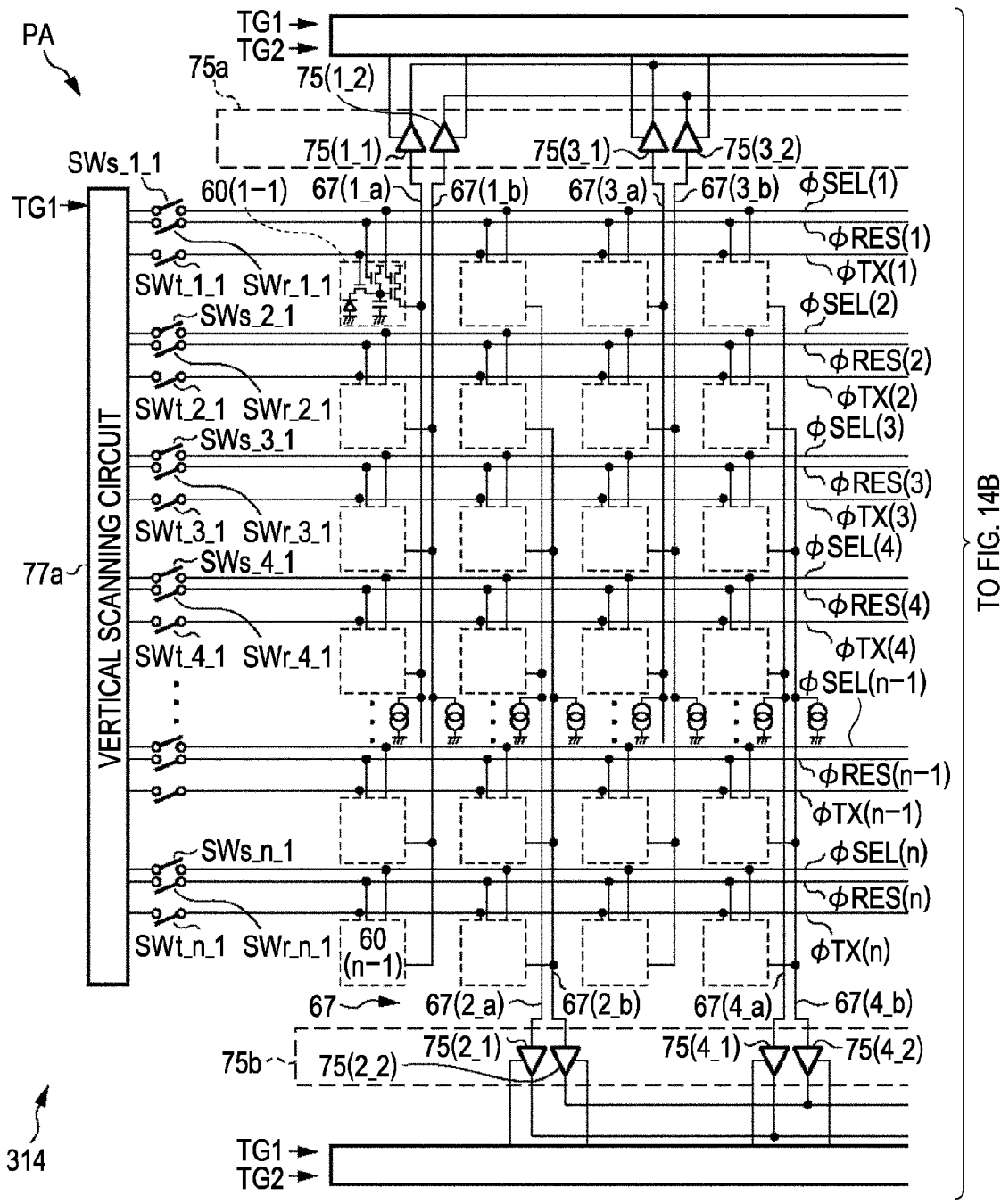
FIGS. 14A and 14B are diagrams showing an example configuration layout of an image pickup apparatus.
Figure 14B:
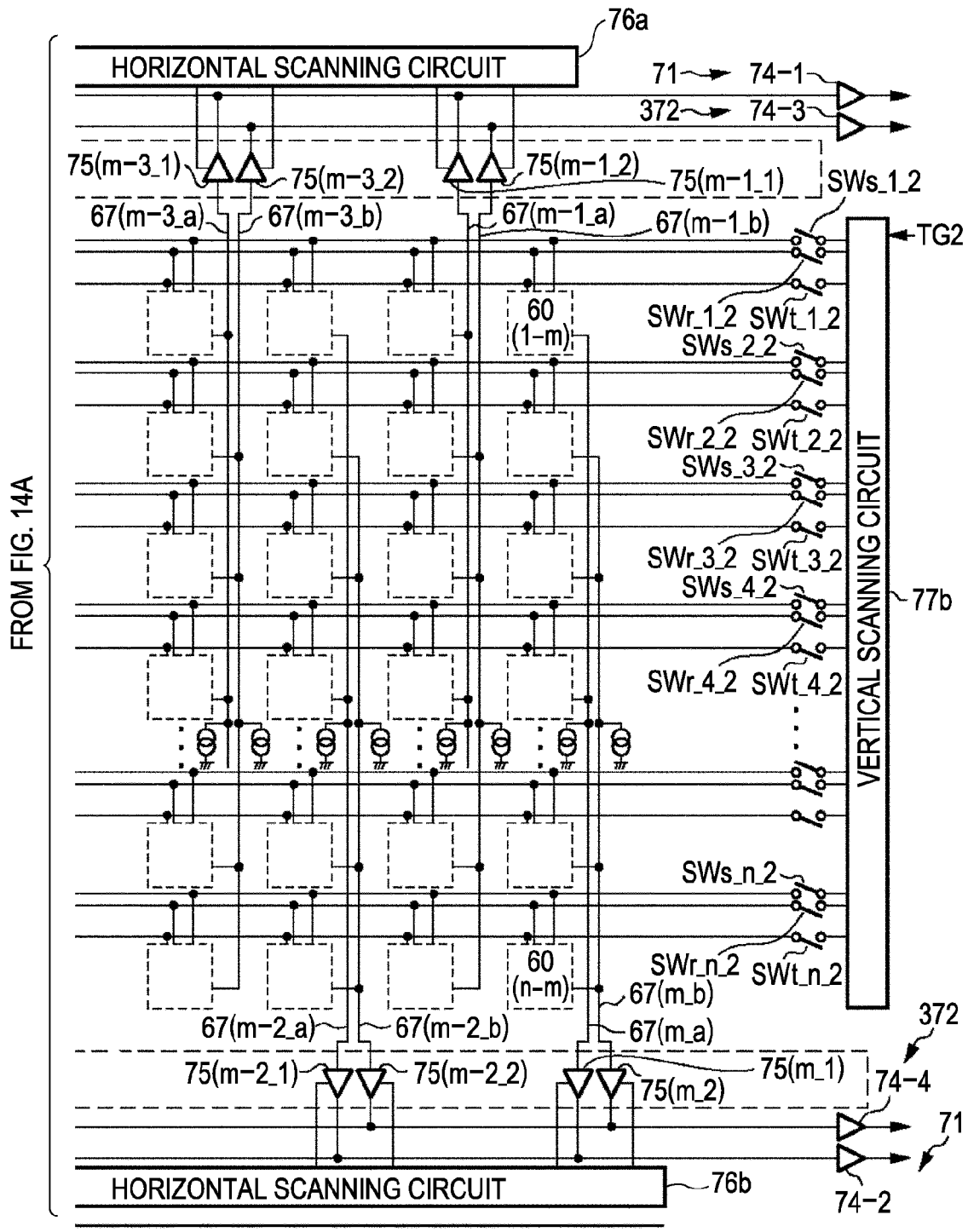

Referring to FIGS. 14A and 14B, the image pickup apparatus 314 differs from the image pickup apparatuses according to the first and second exemplary embodiments in including a second output unit 372. The second output unit 372 is driven by a second driving signal TGsig2 through horizontal scanning circuits 76a and 76b and outputs second signals fed from at least some pixels (second pixels) in a pixel array PA. The second signals are for focusing, light metering, and face detection and are used in, for example, a focusing operation (an AF operation), an exposure control operation (an AE operation), and a face detection operation.

The image processing circuit 320 performs a face detection operation for detecting a face of a subject based on second image data.

Figure 15:
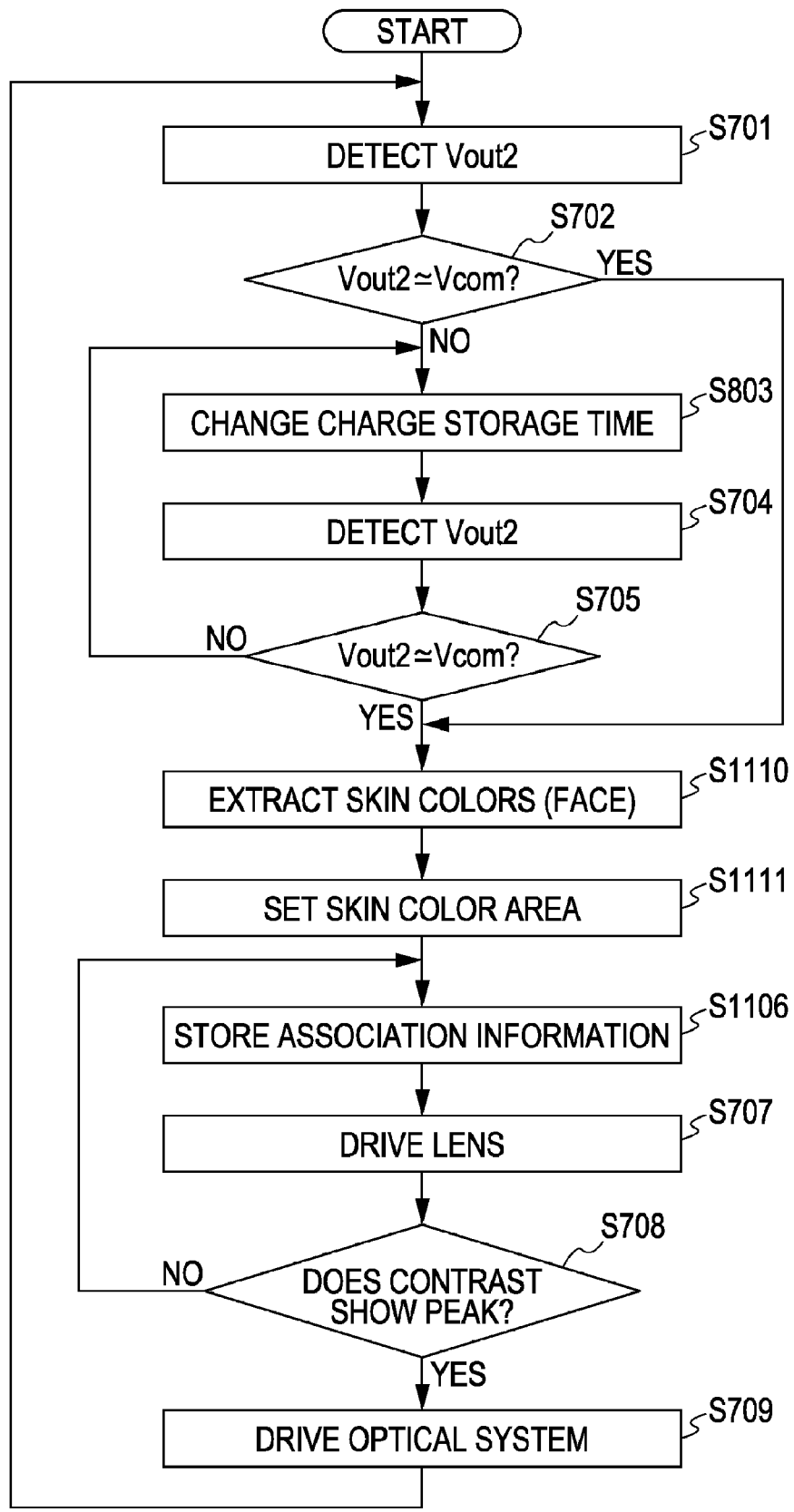
FIG. 15 is a flowchart showing an example operation of a second output unit.

In addition, as shown in FIG. 15, an operation of the second output unit 372 differs from those of the first and second exemplary embodiments in the following points. FIG. 15 is a flowchart showing an example operation of the second output unit 372.

At STEP S1110, the image processing circuit 320 performs color detection of a subject based on the second image data to extract a skin color area (face) of a subject.

At STEP S1111, the image processing circuit 320 identifies a position (pixels) of the extracted skin color area (face) as a face area. Through this operation, the image processing circuit 320 sets the identified face area as a focusing target area.

At STEP S1106, the image processing circuit 320 detects an average intensity of high-frequency components in the face area (focusing target area) of the second image data to determine a contrast value P and supplies the contrast value P to a system control unit 150 through a memory control circuit 122. The system control unit 150 also accesses an optical driving unit 111 to acquire information on a position of an optical system 110. The system control unit 150 stores, in a memory 130, association information for associating the contrast value P and the position of the optical system 110.

In a face detection operation, different asynchronous signals are used as an optical driving signal and a first driving signal TGsig1 for reading out first signals. In this case, the first driving signal TGsig1 and the second driving signal TGsig2 are asynchronous. More specifically, the second driving signal TGsig2 is not synchronized with the first driving signal TGsig1 but is synchronized with the optical driving signal. With this configuration, a subject can be sufficiently tracked in the face detection operation.

Although the operation for separately outputting signals from the first and second output units has been described in the exemplary embodiments of the present invention, the present invention is not limited to this particular operation. For example, signals of all pixels may be output sequentially from the top pixel row in response to a first driving signal generated by a first timing generator during capturing of still images.

In addition, the operation of the second output unit is not limited to an operation for extracting data. For example, the second output unit may thin out signals and output the signals or may be used for displaying of images as in the case of the first output unit.

Furthermore, although the first and second output units are configured separately in the exemplary embodiments of the present invention, the present invention is not limited to this particular configuration. For example, the first and second output units may commonly use horizontal scanning circuits. At this time, a configuration (or a sequence) in which the second output unit is disabled while the first output unit is being horizontally scanned may be employable. In addition, a configuration (or a sequence) in which the first output unit is disabled while the second output unit is being horizontally scanned is employable.

At this time, the first and second output units may be used in different image capturing modes (e.g., an EVF display mode and a movie recording mode).

Additionally, the first driving signal TGsig1 and the second driving signal TGsig2 may be synchronous in a first image capturing mode but may be asynchronous in a second image capturing mode. Here, the first image capturing mode may be a mode in which, for example, a focusing operation, an exposure control operation, and an AF operation are not performed, whereas the second image capturing mode may be a mode in which, for example, a focusing operation, an exposure control operation, and an AF operation are performed. In this case, an operation of the timing generating unit 118 can be simplified. More specifically, the timing generating unit 118 may divides the counts of the second driving signal TGsig2 to generate the first driving TGsig1 in the first image capturing mode.

Similarly, by turning only switches SWt_x_1, SWr_x_1, and SWs_x_1 ON and sequentially controlling all pixels using the first driving signal TGsig1, all of output signals may be treated as the output of the first output unit in the first image capturing mode.

In addition, only a case where the second output unit operates in synchronization with an optical driving signal (which is not synchronized with the first driving signal) has been described in the exemplary embodiments of the present invention, the present invention is not limited to this particular case. For example, the second output unit may employ an exclusive driving reference signal.

With the above-described configurations, it is possible to improve the usability and the performance of observation operations, such as focusing and light metering operations, which are performed at the same time as displaying of movies, such as an EVF display operation, and recording of the movies.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-105251 filed Apr. 12, 2007, which is hereby incorporated by reference herein in its entirety.

What is claimed is:

1. An image capturing system comprising:
an optical system configured to generate an optical image from a subject;
an optical driving unit configured to drive the optical system in accordance with an optical driving signal;
a timing generating unit configured to generate a first driving signal and a second driving signal, wherein the second driving signal is synchronized with the optical driving signal, is asynchronous with the first driving signal, and has a shorter cycle than the first driving signal;
an image pickup apparatus configure to receive the optical image from the optical system and convert the optical image into image signals, wherein the image pickup apparatus includes:
a pixel array including a plurality of photoelectric conversion elements arranged in column and row directions,
a first output unit configured to output a first output unit signal to be utilized in at least one of an image displaying operation and an image capturing operation,
a second output unit configured to output a second output unit signal to be utilized in determining an imaging condition when capturing an image, and
a horizontal scanning circuit configured to supply first photoelectric conversion element signals from the plurality of photoelectric conversion elements to the first output unit in response to receiving the first driving signal from the timing generating unit and to supply second photoelectric conversion element signals from the plurality of photoelectric conversion elements to the second output unit in response to receiving the second driving signal from the timing generating unit.

2. The image capturing system according to claim 1, further comprising:
an exposure calculating unit configured to calculate a target exposure value of the pixel array based on the second output unit signal,
wherein the timing generating unit generates the second driving signal so that a charge storage time of the plurality of photoelectric conversion elements is changed in accordance with the target exposure value calculated by the exposure calculating unit.

3. The image capturing system according to claim 1, wherein the second photoelectric conversion element signals from the plurality of photoelectric conversion elements are signals that are other than the first photoelectric conversion element signals from the plurality of photoelectric conversion elements.

4. The image capturing system according to claim 1, wherein the first photoelectric conversion element signals and the second photoelectric conversion element signals are output from same photoelectric conversion elements and the first output unit and the second output unit output signals at different times.

5. The image capturing system according to claim 1, wherein the image pickup apparatus further includes:
a first vertical scanning circuit configured to supply first switch signals to the pixel array in response to receiving, from the timing generating unit, the first driving signal, and
a second vertical scanning circuit configured to supply second switch signals to the pixel array in response to receiving, from the timing generating unit, the second driving signal that is asynchronous with the first driving signal.

6. The image capturing system according to claim 5, wherein, in response to one of the first vertical scanning circuit and the second vertical scanning circuit supplying switch signals to the pixel array, the other of the first vertical scanning circuit and the second vertical scanning circuit is prevented from supplying switch signals to the pixel array.

* * * * *